(12) United States Patent
Hozumi

(10) Patent No.: US 8,601,157 B2
(45) Date of Patent: Dec. 3, 2013

(54) DEVICE, METHOD, AND SYSTEM OF COMMUNICATING VIA RELAY DEVICE, AND RECORDING MEDIUM STORING COMMUNICATION CONTROL PROGRAM

(75) Inventor: Hiroshi Hozumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 15 days.

(21) Appl. No.: 13/415,256

(22) Filed: Mar. 8, 2012

(65) Prior Publication Data

US 2012/0239821 A1 Sep. 20, 2012

(30) Foreign Application Priority Data

Mar. 18, 2011 (JP) ................................. 2011-061475

(51) Int. Cl.
*G06F 15/173* (2006.01)

(52) U.S. Cl.
USPC ............................ 709/238; 709/203; 709/226

(58) Field of Classification Search
USPC ......................... 709/203, 226, 238, 219, 220
See application file for complete search history.

(56) References Cited

U.S. PATENT DOCUMENTS

| | | | |
|---|---|---|---|
| 2001/0018328 A1* | 8/2001 | Ohkura et al. | 455/15 |
| 2007/0133587 A1* | 6/2007 | Hibino et al. | 370/428 |
| 2009/0070468 A1* | 3/2009 | Ohta | 709/226 |

FOREIGN PATENT DOCUMENTS

| | | |
|---|---|---|
| JP | 2003-323360 | 11/2003 |
| JP | 2004-140818 | 5/2004 |
| JP | 2009-32277 | 2/2009 |

* cited by examiner

*Primary Examiner* — El Hadji Sall
(74) *Attorney, Agent, or Firm* — Oblon, Spivak, McClelland, Maier & Neustadt, L.L.P.

(57) ABSTRACT

In a communication system, one of a plurality of relay devices is assigned to a communication device that communicates with a counterpart communication device. When a request for assigning a relay device to the communication device is received, one of the plurality of relay devices is assigned to the communication device based on processing load information indicating a processing load of each one of the plurality of relay devices.

14 Claims, 24 Drawing Sheets

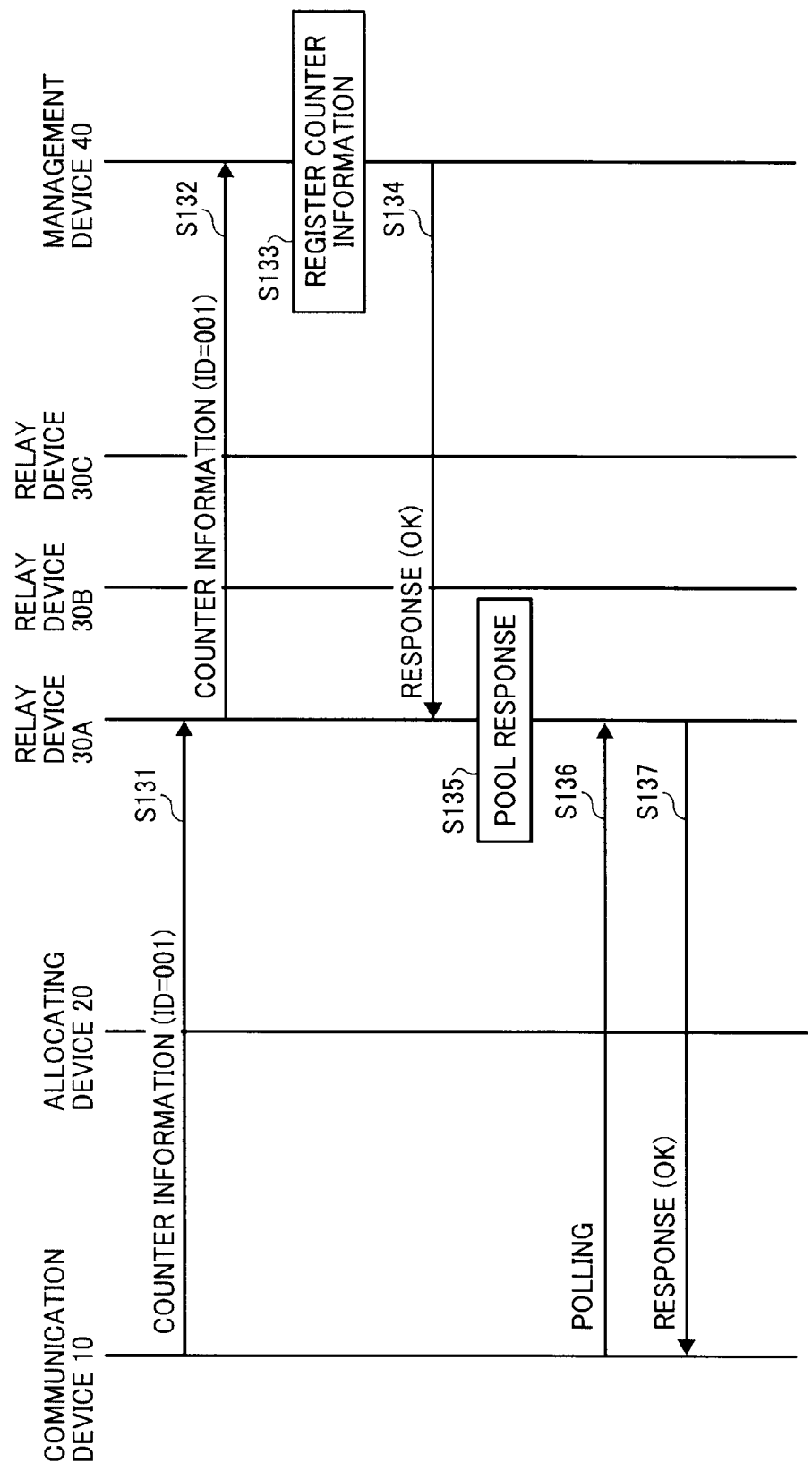

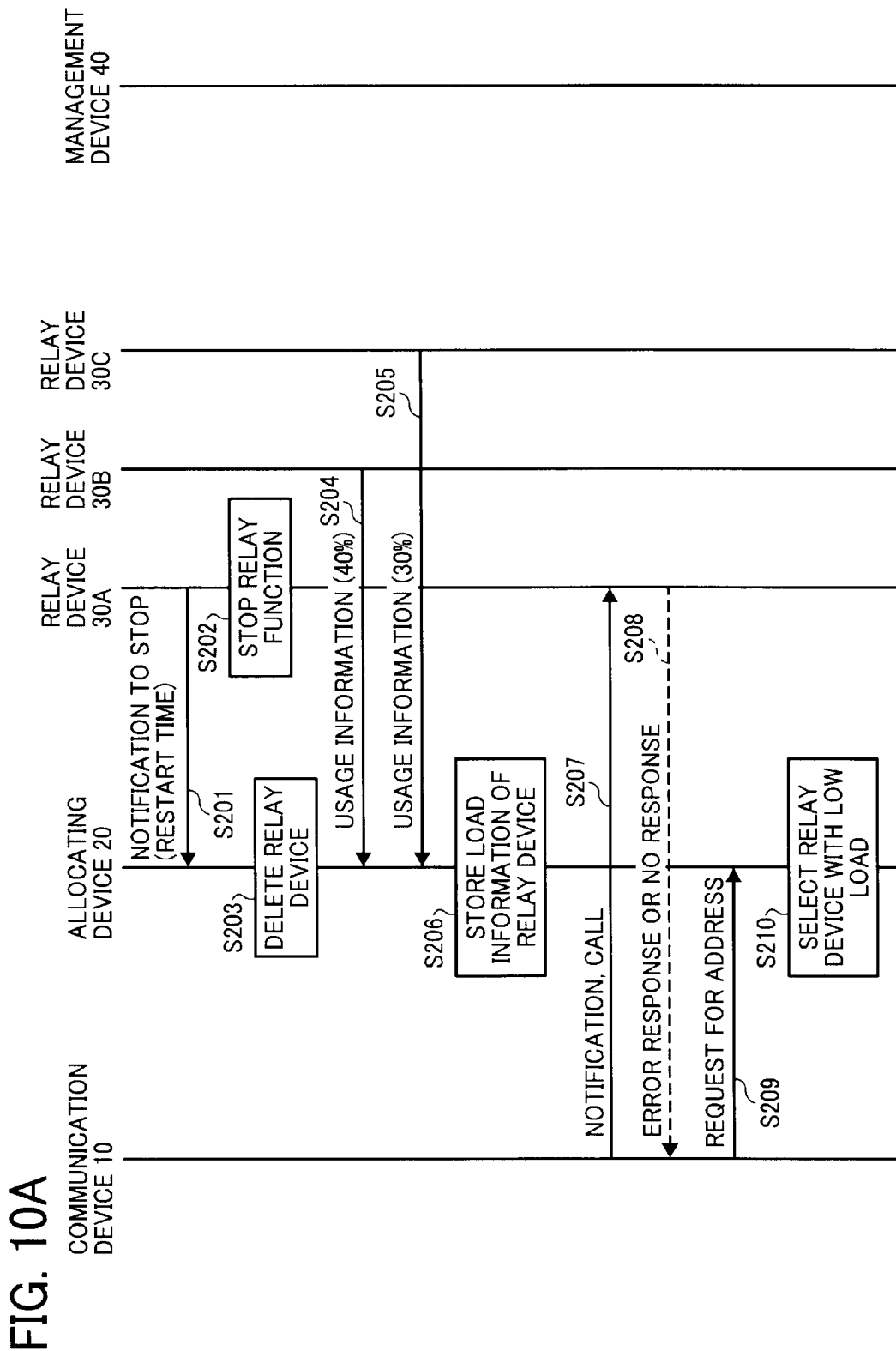

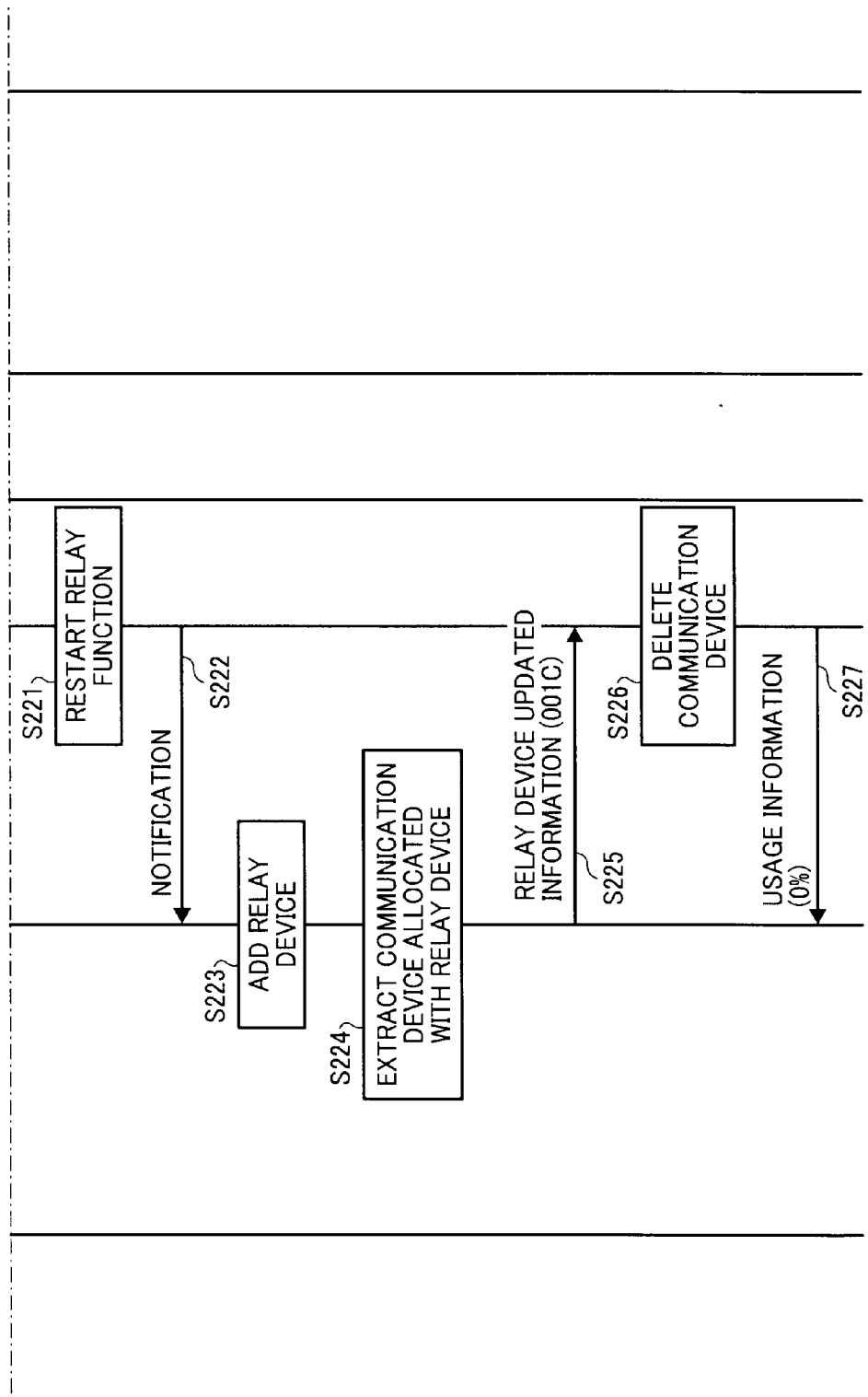

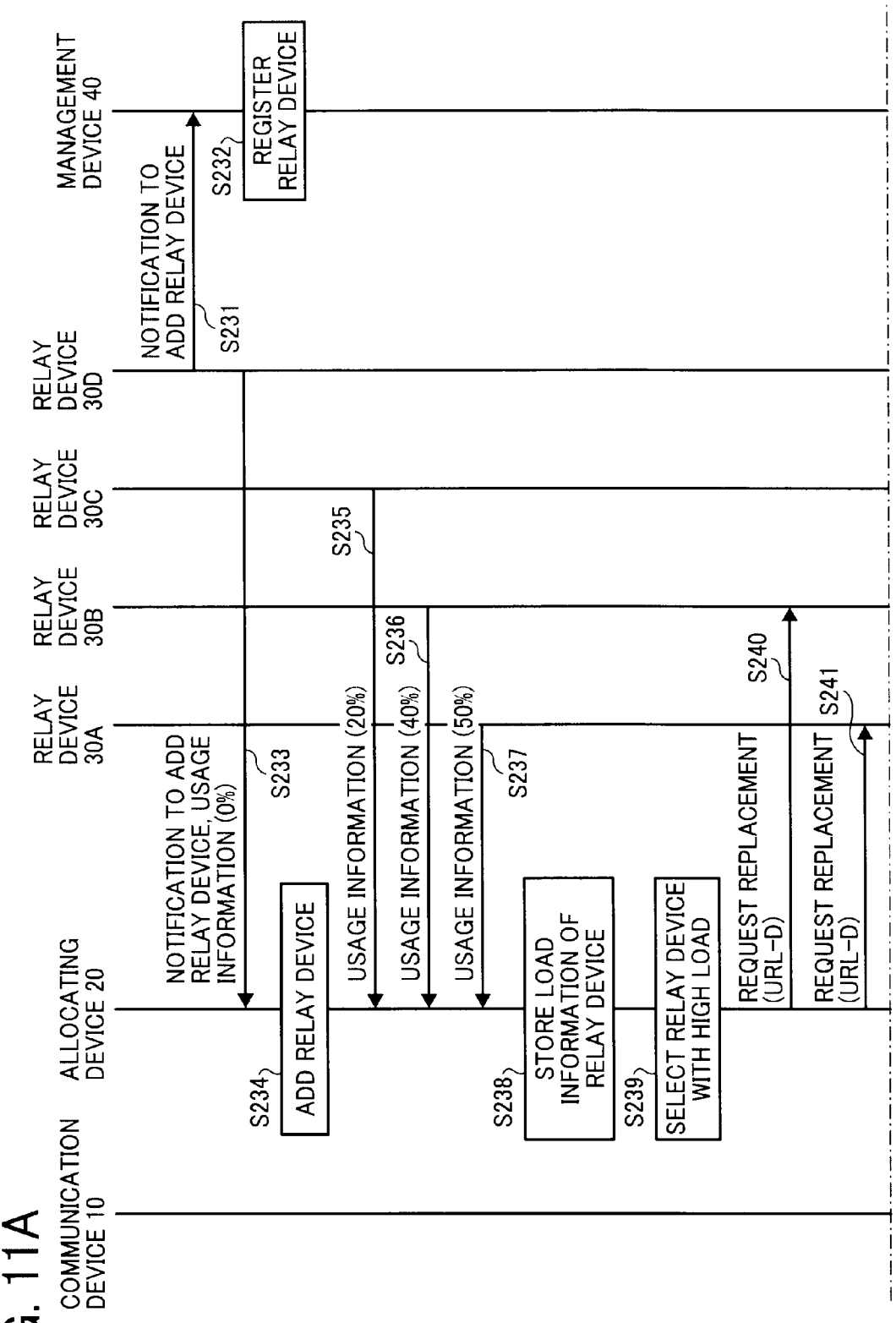

DEVICE, METHOD, AND SYSTEM OF COMMUNICATING VIA RELAY DEVICE, AND RECORDING MEDIUM STORING COMMUNICATION CONTROL PROGRAM

CROSS-REFERENCE TO RELATED APPLICATIONS

This patent application is based on and claims priority pursuant to 35 U.S.C. §119 to Japanese Patent Application No. 2011-061475, filed on Mar. 18, 2011, in the Japan Patent Office, the entire disclosure of which is hereby incorporated by reference.

BACKGROUND

1. Field

The present invention generally relates to a device, system, and method of communicating via one of a plurality of relay devices that is allocated to a communication device, and a recording medium storing a control program that causes a processor to communicate via one of the plurality of relay devices that is allocated to the communication device.

2. Background

Japanese Patent Application Publication No. 2003-323360 describes a remote management system in which a plurality of image forming devices at a user site communicates with a management device at a services provider site through the Internet. In order to allow the image forming device to communicate with the management device, a relay device is provided at the user site such that the relay device relays communications between the image forming device and the management device.

However, it has been cumbersome for the services provider to manage the relay device, which should be set at the user site. For example, in order to set the relay device at the user site, the services provider needs to send the relay device to the user site or send a service technician to the user site to set up the relay device. Further, a number of relay devices or a function of the relay device may need to be changed as a configuration of a communication system at the user site changes, for example, when a new image forming device is introduced. In case of upgrading firmware of the relay device, the services provider is not able to transfer the latest version of firmware to the relay device unless there is an access by the relay device.

SUMMARY

In view of the above, the inventor of the present invention has realized that it is more convenient to set the relay device at a site that can be easily managed by the services provider, such as the services provider site. For example, the relay function or the relay device providing the relay function may be provided in the cloud. In such case, the management device sends a request addressed to a communication device such as the image forming device, to the relay device in the cloud to cause the relay device to pool the request at least temporarily. The communication device to be managed by the management device is caused to periodically access the relay device in the cloud to obtain the request transmitted from the management device that is pooled at the relay device.

While this allows the communication device and the management device to communicate with each other through the relay device, providing the relay device in the cloud makes difficult for the communication device and the management device to identify a specific relay device to be accessed. Further, if the communication device or a user at the communication device is allowed to select a specific relay device in the cloud, the workload may not be equally distributed over a plurality of relay devices that are available on the cloud, thus causing a delay in processing the request or a communication error.

One aspect of the present invention is to provide a technique of allocating one of a plurality of relay devices as a relay device that relays communications between a communication device and a counterpart communication device through a network in a manner such that communications between the communication device and the counterpart communication device are performed more smoothly.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a data sequence diagram illustrating operation of sending state information from the communication device to the management device through the relay device, performed by the communication system of FIG. 1, according to an example embodiment of the present invention;

FIGS. 10A to 10C are a data sequence diagram illustrating operation of changing the allocation of a relay device to the communication device that is assigned with the relay device, performed by the communication system of FIG. 1, according to an example embodiment of the present invention;

FIGS. 11A to 11C are a data sequence diagram illustrating operation of changing the allocation of a relay device to the communication device that is assigned with the relay device, performed by the communication system of FIG. 1, according to an example embodiment of the present invention;

Figure 1:
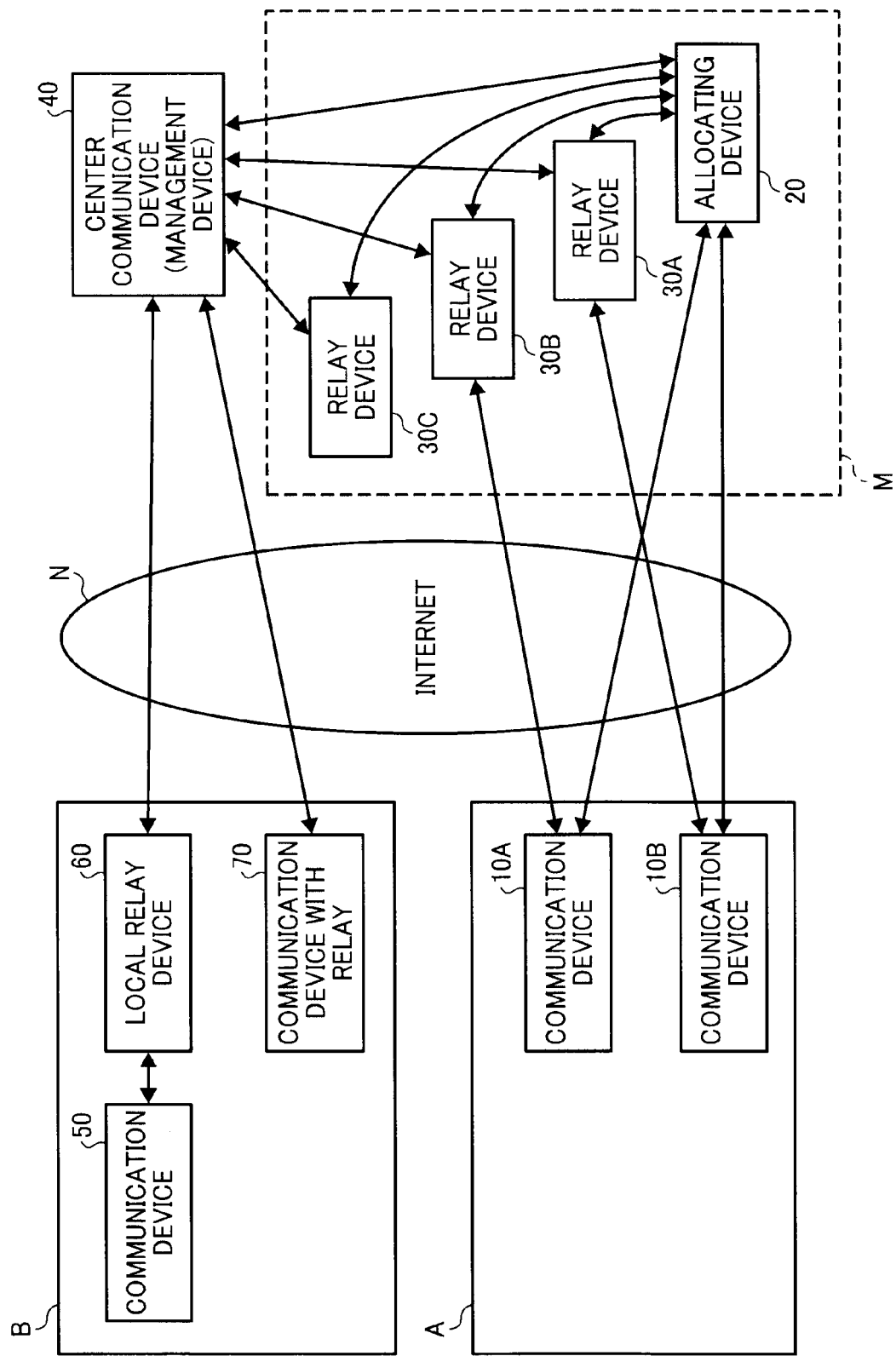
FIG. 1 is a schematic block diagram illustrating a communication system including an allocating device, a plurality of relay devices, and a plurality of communication devices including a management device, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, a configuration of a communication system including an allocating device, a plurality of relay devices, and a plurality of communication devices is explained according to an example embodiment of the present invention.

The communication system of FIG. 1 includes a plurality of communication devices 10A and 10B (collectively referred to as the "communication device 10") each provided on a local area network (LAN) A, a center communication device 40 that is provided at a site remote from the LAN A, and a relay system M that relays data between the communication device 10 and the center communication device 40. The communication system of FIG. 1 further includes a communication device 50, a local relay device 60, and a communication device 70 provided with a relay function on a local area network (LAN) B.

In this example, the communication system of FIG. 1 functions as a remote management system that manages a plurality of communication devices using the center communication device 40. The center communication device 40 is provided at a services provider site, which is remotely located from any one of the user sites of LAN A and LAN B. More specifically, the center communication device 40 functions as a management device that remotely manages the plurality of communication devices 10, 50, and 70 provided on the user sites via the Internet N.

The communication device 50 communicates with the center communication device 40 via the local relay device 60. The communication device 70 communicates with the center communication device 40 using the relay function that is provided in the communication device 70. Assuming that a firewall is provided in the LAN B to prohibit access from the outside, the local relay device 60 periodically accesses the center communication device 40 to obtain a request addressed to the communication device 50, and transfers the request to the communication device 50 to cause the communication device 50 to execute the request and return a response to the center communication device 40. In a substantially similar manner, the communication device 70 with relay function periodically accesses the center communication device 40 to obtain a request addressed to the communication device 70, and returns a response including an executing result of the request to the center communication device 40.

However, in this example, none of the communication devices 10A and 10B are provided with the relay function, or no relay device is provided on the LAN A. The communication device 10 communicates with the center communication device 40 via the relay system M that provides the relay function to the communication device 10. The relay device M may be provided at a site remote from the provider site at which the center communication device 40 is provided.

The relay system M includes a plurality of relay devices 30A, 30B, and 30C (collectively referred to as the "relay device 30"), and an allocating device 20. The relay device 30 relays data between the communication device 10 and the center communication device 40 to allow communication between the communication device 10 and the center communication device 40. The allocating device 20 assigns one of the plurality of relay devices 30 to each one of the plurality of communication devices 10 as a relay device that relays communications between the communication device 10 and the center communication device 40. In this example, the relay system M is provided at the services provider site.

The communication device 10 communicates with the relay device 30, which is assigned, through the Internet N so as to cause the relay device 30 to relay data to or from the center communication device 40. For example, the communication device 10 accesses the relay device 30 to transmit various data addressed to the center communication device 40 to the relay device 30. For example, data such as notices, commands, and execution results of commands may be transmitted. The relay device 30 transfers the received data to the center communication device 40 as it is received. Alternatively, the relay device 30 may transfer the accumulated received data after pooling the received data for a predetermined time period or until the accumulated received data reaches a certain level.

The LAN A is provided with a firewall such that the relay device 30 is not able to directly access the communication device 10. The relay device 30 pools any data to be transmitted from the center communication device 40 to the communication device 10 at least temporarily. When the communication device 10 periodically accesses the relay device 30, which may be referred to as polling, the relay device 30 obtains data that is addressed to and pooled for the communication device 10 that accesses. Alternatively, the communication device 10 may obtain data that is addressed to the communication device 10 from the relay device 30, when the communication device 10 accesses the relay device 30 to transmit data to the center communication device 40.

The communication device 10 accesses the allocating device 20 to be assigned with the relay device 30, when the communication device 10 is made communicable with the center communication device 40. Examples of such case include, but not limited to, the time when an communication application program providing the function of communicating with the center communication device 40 is installed onto the communication device 10, the time when the communication application program is executed while the communication device 10 is being connected to the Internet N, and the time when the communication application program is executed and the communication device 10 is connected to the Internet N. The communication device 10, which accesses the allocating device 20, obtains information to be used for accessing the relay device 30 being assigned, from the allocating device 20. For example, the communication device 10 receives identification information such as an address of the relay device 30 that may be expressed in uniform resource locator (URL) address, an ID of the relay device 30, and a password that is associated with the ID, and accesses the relay device 30 that is assigned using the received information.

In FIG. 1, the communication device 10A and the communication device 10B are assigned with the relay device 30B and the relay device 30A, respectively. Alternatively, one relay device 30 may be assigned to a plurality of communication devices 10.

The allocating device 20 collects information regarding the processing load of the relay device 30, from each relay device 30. Using the collected processing load information, the allocating device 20 selects the relay device 30 to be assigned with one or more communication devices 10 so as to avoid the work to be concentrated onto one relay device. The allocating device 20 stores information indicating one or more communication devices 10 that are assigned to the relay device 30 for each relay device 30. The allocating device 20 transmits such information, which may be referred to as allocation information, to the relay device 30 or the center communication device 40. Based on the allocation information transmitted from the allocating device 20 or information indicating the access from the communication device 10, the relay device 30 is able to know a specific communication device 10 that the relay device 30 is communicating with to relay data.

The center communication device 40 also manages allocation information indicating the association between the communication device 10 and the relay device 30 that relays data for the communication device 10, for each one of the communication devices 10 to be managed. Using this allocation information, the center communication device 40 identifies the relay device 30, which is assigned to a specific communication device 10 to which the center communication device 40 desires to send data. The center communication device 40 transmits data addressed to the communication device 10, to the identified relay device 30 to cause the relay device 30 to pool such data.

The center communication device 40 may manage the allocation information based on the allocation information transmitted from the allocating device 20. More preferably, the center communication device 40 constantly updates the allocation information for each of the communication devices 10, by checking identification information of a specific relay device 30 that transmits data received from the communication device 10 to the center communication device 40. The updating of the allocation information is preferable since the association between the communication device 10 and the relay device 30 is constantly changed, as described below.

Further, in this example, before starting communication with the center communication device 40 through the relay device 30, the communication device 10 requests the center communication device 40 to be registered itself as a communication device to be managed by the center communication device 40. The communication device 10 may request the center communication device 40 to delete itself from a list of devices subject for management, for example, before making the function of communicating with the center communication device 40 to be invalid.

In one example, the above-described function of communicating with the center communication device 40 may be previously embedded in the communication device 10 as the communication application program. More preferably, the function of communicating with the center communication device 40 may be provided as a software development kit (SDK) application, which is developed using the SDK and operates on an operating system (OS) platform of the communication device 10. Through the SDK application, any communication device 10, which may be provided by a provider other than the services provider of the center communication device 40 and the relay device 30, is able to communicate with the center communication device 40 as a device subjected for management by the center communication device 40.

Further, in the communication system of FIG. 1, the relay device 30 may be added to or deleted from a list of relay devices to be managed by the allocating device 20 at any desired time. In such case, the relay device 30, which is to be added or deleted, sends notification to the allocating device 20. With this notification, the allocating device 20 is able to manage the candidate relay devices 30 each of which may be assigned to the communication device 10. For example, operation of the relay device 30 may be temporarily stopped due to maintenance. In such case, the relay device 30 sends notification to the allocating device 20. Additionally, the relay device 30 may send notification to the center communication device 40 to notify that the relay device 30 is to be added to or deleted from the list of devices subjected for management by the center communication device 40. With this notification, the center communication device 40 is able to know about the relay devices 30 that are available in the communication system.

Figure 2:
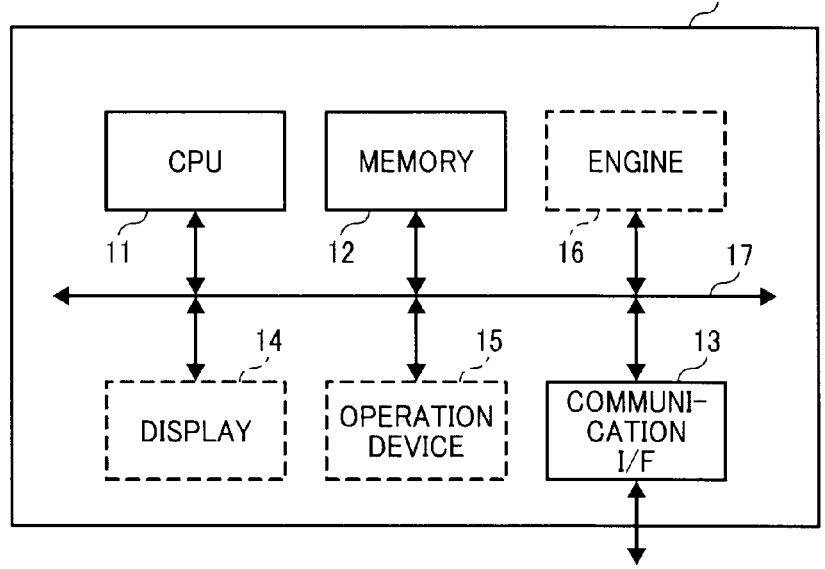
FIG. 2 is a schematic block diagram illustrating a hardware structure of any one of the communication device, the allocating device, the relay device, and the management device of the communication system of FIG. 1.

Referring now to FIG. 2, a hardware structure of the communication device 10 is explained according to an example embodiment of the present invention. As illustrated in FIG. 2, the communication device 10 includes a central processing unit (CPU) 11, a memory 12, and a communication interface (I/F) 13, which are connected through a system bus 17.

The CPU 11 controls entire operation of the communication device 10. For example, the CPU 11 executes various programs stored in the memory 12 to perform various operations. In this example, the memory 12 includes a nonvolatile memory, a volatile memory, and a rewritable nonvolatile memory, etc. The nonvolatile memory, such as a read only memory (ROM), stores therein various programs for execution by the CPU 11 or various parameters. The volatile memory, such as a random access memory (RAM), temporarily stores various data or functions as a work memory of the CPU 11. The rewritable nonvolatile memory, such as a flash memory or a hard disk drive (HDD), stores data such as parameters. The data stored in the nonvolatile memory is not deleted even after the power of the communication device 10 is turned off.

The communication I/F 13 is an interface that allows the communication device 10 to connect to the network. For example, the communication I/F 13 may be implemented by a network interface in compliance with the Ethernet. Alternatively, any desired communication route or protocol may be used, based on wired or wireless network. To improve the security, the communication route may be preferably provided with the function of encrypting or authenticating.

The communication device 10 may further include a display 14, an operation device 15, and an engine 16.

The display 14 may be implemented by a display that displays a message or a graphical user interface (GUI) to the user to notify the user of an operation state of the communication device 10. The display 14 may be implemented by a lamp, which is lighted up to indicate warning to the user. The operation device 15 may be implemented by a switch, touch panel, keyboard, or pointing device, which allows the user to input a user instruction to the communication device 10.

The engine 16 causes the communication device 10 to output data to the outside or input data from the outside. For example, if the communication device 10 is implemented by a laser printer, the engine 16 corresponds to a print engine that forms an image on a recording sheet using an electrophotographic method. If the communication device 10 is implemented by a scanner, the engine 16 corresponds to a scanner engine that reads an original image into scanned image data.

In this example, the allocating device 20, the relay device 30, and the center communication device 40 has a hardware structure that is substantially similar to the hardware structure illustrated in FIG. 2.

Figure 3:
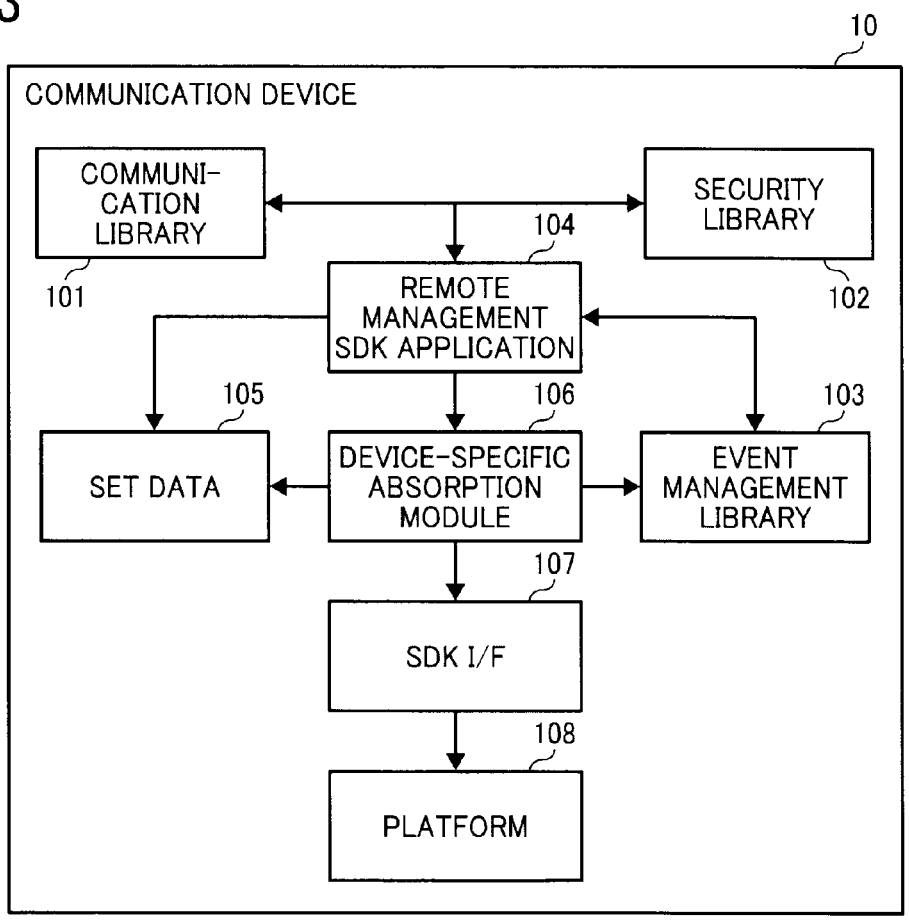
FIG. 3 is a schematic block diagram illustrating a functional structure of the communication device of the communication system of FIG. 1.

Referring now to FIG. 3, a software structure of the communication device 10 is explained according to an example embodiment of the present invention. As described above referring to FIG. 1, when the SDK application providing the function of communicating with the center communication device 40 is installed and executed by the CPU 11, the communication device 10 is caused to have a software or functional structure as illustrated in FIG. 3. Referring to FIG. 3, the communication device 10 includes a communication library 101, a security library 102, an event management library 103, a remote management SDK application 104, a set data 105, a device-specific absorption module 106, a SDK I/F 107, and a platform 108.

The communication library 101 is a library, which collects various programs to cause the communication device 10 to perform the function of communicating through the network such as the Internet N.

The security library 102 is a library, which collects various programs to cause the communication device 10 to perform the function of authenticating a device or a user at the device, or the function related to encrypted communications.

The event management library 103 is a library, which collects various programs to cause the communication device 10 to perform the function of managing an event issued by the communication device 10, or an event relating to a command received from the outside or notification received from the outside.

The remote management SDK application 104 is an application, which causes the communication device 10 to be remotely managed by the center communication device 40, for example, by sending an event issued at the communication device 10 to the center communication device 40, or executing an operation at the communication device 10 according to a command received from the center communication device 40. More specifically, the remote management SDK application 104 causes the communication device 10 to communicate with the center communication device 40 through the relay device 30 as described above referring to FIG. 1, using any one of the communication library 101, the security library 102, and the event management library 103.

The set data 105 corresponds to one or more parameters to be used by the remote management SDK application 104 when communicating with the center communication device 40. The set data 105 includes an address of the relay device 30 to be accessed, and a cycle of polling.

In one example, the set data 105 may be previously stored in the memory 12 of the communication device 10 such as the rewritable nonvolatile memory.

Alternatively, upon execution of the remote management SDK application 104, the communication device 10 may access the allocating device 20 or the relay device 30 to download the set data 105 from the allocation device 20 or the relay device 30. Unless the remote management SDK application 104 is executed, the communication device 10 does not have to provide a memory space for storing the set data to be used by the remote management SDK application 104. This helps the communication device 10 to treat the function of communicating with the center communication device 40 for remote management to be independent from the other functions of the communication device 10. The address of the allocating device 20, which is used for accessing the allocating device 20, is previously written in a program of the remote management SDK application 104 or stored as a part of the parameters to be used by the communication device 10. The remote management SDK application 104 obtains the address of the allocating device 20 when the remote management SDK application 104 is executed.

The device-specific absorption module 106, which may be referred to as a wrapper, is a module that absorbs the change in data formats or parameter items, which may be caused when a type of the communication device 10 is changed, so as to allow the remote management SDK application 104 to operate on various types of the communication device 10. For example, notification to be sent from the remote management SDK application 104 to the center communication device 40 includes a fixed part and a variable part. For the variable part of the notification, the device-specific absorption module 106 may change a parameter name and a parameter value.

The platform 108 functions as an environment where the communication device 10 is controlled. The platform 108 may be implemented by the operating system (OS) of the communication device 10.

The SDK I/F 107 is an application program interface (API), which may be used for developing software that accesses the platform 108.

Figure 4:
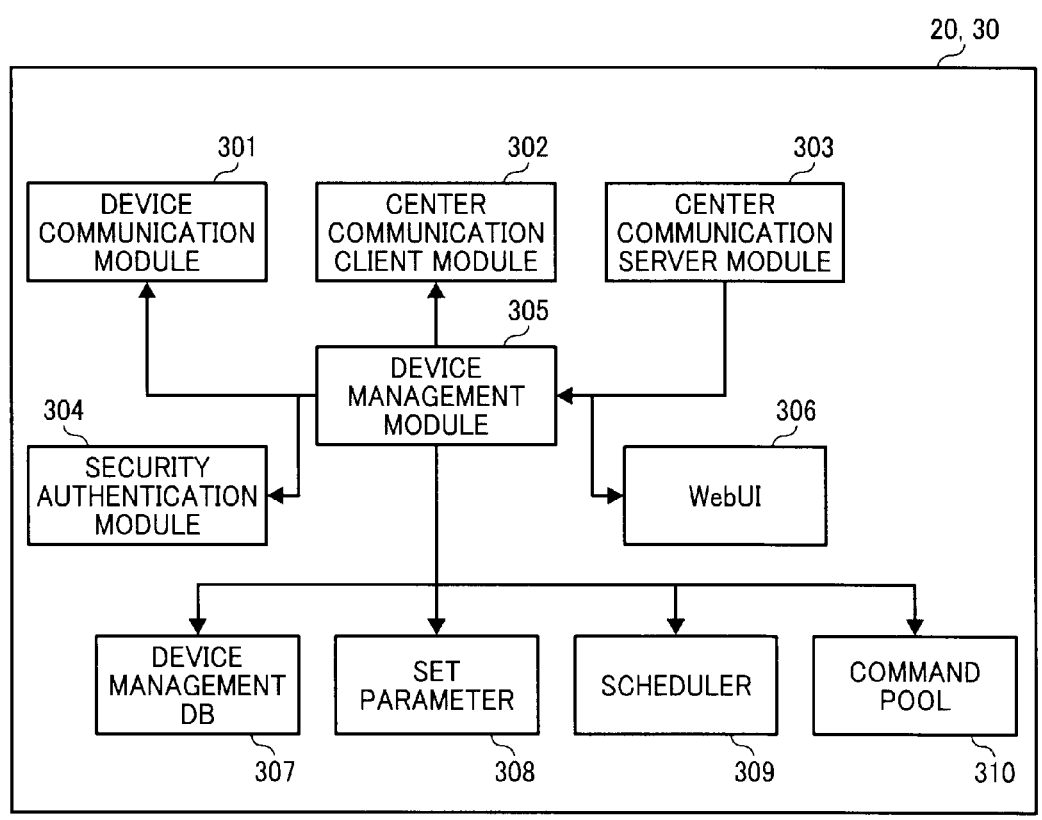
FIG. 4 is a schematic block diagram illustrating a functional structure of any one of the relay device and the allocating device of the communication system of FIG. 1.

Referring now to FIG. 4, a software structure of the relay device 30 is explained according to an example embodiment of the present invention. More specifically, when a relay communications control program is installed, the relay device 30 having the structure of FIG. 2 is caused to have a software or functional structure illustrated in FIG. 4. Referring to FIG. 4, the relay device 30 includes a device communication module 301, a center communication client module 302, a center communication server module 303, a security authentication module 304, a device management module 305, a Web user interface (Web UI) 306, a device management database (DB) 307, a set parameter 308, a scheduler 309, and a command pool 310.

The device communication module 301 is a module that causes the relay device 30 to communicate with the communication device 10. In this example, the communication device 10 is provided within the firewall. The device communication module 301 causes the relay device 30 to function as a server that receives a communication request from the communication device 10, and sends a communication response to the communication device 10 in response to the communication request.

The center communication client module 302 is a module that causes the relay device 30 to function as a client that accesses the center communication device 40 to communicate with the center communication device 40. More specifically, the center communication client module 302 causes the relay device 30 to function as a client that sends a communication request to the center communication device 40, and receives a communication response from the center communication device 40 in response to the communication request.

The center communication server module 303 is a module that causes the relay device 30 to function as a server that communicates with the center communication device 40 in response to the access made by the center communication device 40. More specifically, the center communication server module 303 causes the relay device 30 to function as a server that receives a communication request from the center communication device 40, and sends a communication response to the center communication device 40 in response to the communication request.

In this example, it is assumed that the relay device 30 and the center communication device 40 are managed by the same services provider, such that the relay device 30 and the center communication device 40 are made accessible from each other. Alternatively, the relay device 30 and the center communication device 40 may be made accessible only in one direction. In such case, one of the relay device 30 and the center communication device 40 functions as a server, and the other one of the relay device 30 and the center communication device 40 functions as a client. Depending on which of the server function and the client function is to be performed, the relay device 30 may only be provided with the module that functions as the server (such as the center communication server module 303) or the module that functions as the client (such as the center communication client module 302).

Further, the relay device 30 is able to communicate with the allocating device 20 using any one of the above-described communication modules 302 and 303, since the relay device 30 and the allocating device 20 are provided in the relay system M.

The security authentication module 304 is a module that causes the relay device 30 to perform the function relating to authentication of a device or authentication of a user who operates the device, and the function relating to encryption of communications.

The device management module 305 is a module that causes the relay device 30 to perform the function of relaying communications between the center communication device 40 and the communication device 10 so as to cause the center communication device 40 to manage the communication device 10. More specifically, the device management module 305 of the relay device 30 manages the times to transmit communications data or the status in data transmission. Through management by the device management module 305, the center communication device 40 is able to transmit various data to the communication device 10 via the firewall, or receive various data from the communication device 10 via the firewall, while suppressing the processing load onto the center communication device 40. As described below, the device management module 305 communicates with the remote management SDK application 104 of the communication device 10 using the set parameter 308, through the device communication module 301 and the security authentication module 304, to perform transmission or reception of various data to or from the center communication device 40.

The Web UI 306 is a module that functions as a user interface, which allows the outside device to access the relay device 30 through a web browser to refer to or set various data stored in the device management DB 307.

The device management DB 307 is a database used for managing various information of the communication device 10 to be managed by the relay device 30 to relay data between the communication device 10 and the center management device 40. The relay device 30 transmits various data read from the device management DB 307 to the center communication device 40 through the center communication client module 302, or receives various data from the center communication device 40 through the center communication server module 302 to update various data in the device management DB 307.

The set parameter 308 corresponds to various parameters to be used when communicating with the communication device 10, the allocating device 20, or the center communication device 40. For example, the set parameter 308 includes a parameter indicating the time at which data received from the communication device 10 is transferred to the center communication device 40, and a parameter indicating the time at which data indicating the processing load of the relay device 30 is notified to the allocating device 20.

The scheduler 309 provides the function of managing the time at which the relay device 30 sends notification to the center communication device 40 or the allocating device 20, or the time at which the command received from the center communication device 40 is deleted.

The command pool 310 provides the function of temporarily storing various data that is received from the center communication device 40 for the communication device 10 including command, notices, and responses, until such data is transferred to the destination communication device 10. The command pool 310 further provides the function of temporarily storing various data that is received from the communication device 10 for the center communication device 40, until such data is transferred to the center communication device 40.

In this example, the allocating device 20 has a functional structure described above referring to FIG. 4. For example, one of the relay devices 30 in the relay system M may function as the allocating device 20, which manages allocation of the relay device 30 to the communication device 10.

The center communication device 40, which has a hardware structure illustrated in FIG. 2, includes at least one of a communication client module that causes the center communication device 40 to function as a client that sends a request to the relay device 30, and a communication server module that causes the center communication device 40 to function as a server that receives a response from the relay device 30 in response to the request. The center communication device 40 further includes a management DB, a web UI, and a security authentication module, etc. The management DB that stores various information regarding devices that are registered into the communication system such as the communication device 10 and the relay device 30. Further, as described below referring to FIGS. 12 and 13, in one example, the center communication device 40 may additionally include a memory that stores information regarding an unprocessed request that is sent to the relay device but not processed by the communication device 1.

Now, examples operations of communicating between the communication device 10 and the center communication device 40 through the relay device 40 are explained. In the following examples, the communication device of FIG. 1 is implemented as a remote management system in which the center communication device 40 remotely manages the communication device 10. For the descriptive purposes, the center communication device 40 may be referred to as the management device 40. Further, it is assumed that the communication device 10 is implemented by an image forming apparatus such as a copier, printer, or multifunctional printer (MFP). The allocating device 20, the relay device 30, and the center communication device 40 may be implemented by a general-purpose computer, which is installed with a computer program that causes the computer to function as the allocating device 20, the relay device 30, and the center communication device 40, respectively.

Referring now to FIGS. 5A to 5E, operation of remotely managing the communication device 10 using the management device 40, performed by the communication system of FIG. 1, is explained according to an example embodiment of the present invention. In this example, the other system 80 is provided, which cooperates with the management device 40 to provide services to a user at the communication device 10, or to assist the management device 40 in providing services to the user at the communication device 10. For example, the other system 80 includes a plurality of systems each provided by a different services provider such that each system of the other system 80 may be located in a site where each services provider is located.

Figure 5A:
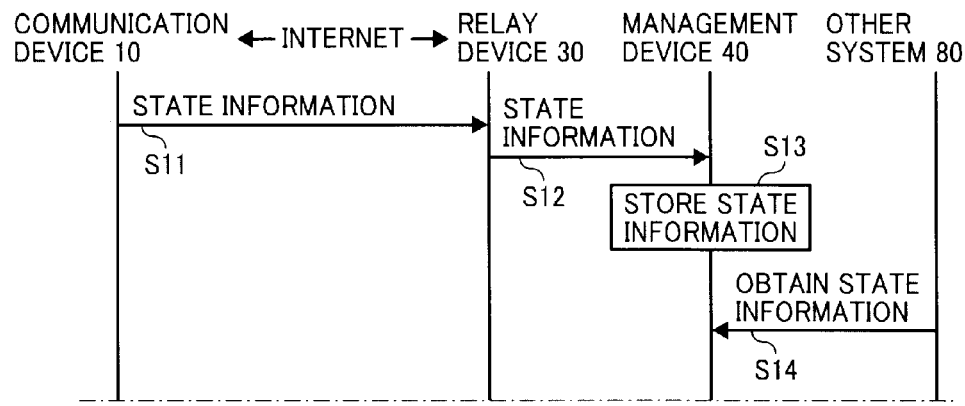
FIG. 5A is a data sequence diagram illustrating operation of sending state information from the communication device to the management device, performed by the communication system of FIG. 1, according to an example embodiment of the present invention.

FIG. 5A illustrates the example case in which the communication device 10 periodically sends state information regarding the current state of the communication device 10 to the management device 40.

At S11, the communication device 10 periodically sends state information to the relay device 30. For example, when the communication device 10 determines that a counter value of a timer reaches a predetermined value, the communication device 10 collects various state information regarding the current state of the communication device 10 including, for example, counter information indicating a number of printed sheets, error occurrence information indicating the occurrence rate of error such as a jam error, and consumption information indicating a toner consumption. The communication device 10 sends the collected state information to be transmitted to the management device 40, to the relay device 30. In such case, the communication device 10 sends a communication request including a plurality of operation request each including state information to the relay device 30.

More specifically, in this example, at the communication device 10, the remote management SDK application 104 requests the platform 108 for a predetermined parameter value, through the device-specific absorption module 106 and the SDK I/F 107, to collect state information of the communication device 10.

At S12, the relay device 30 transfers the received state information to the management device 40. The relay device 30 may transfer the state information immediately after the state information is received. Alternatively, the relay device 30 may pool the state information, and transmits the accumulated state information to the management device 40 when the accumulated state information reaches a certain level.

When the state information is received, the management device 40 stores the received state information as information indicating the operation state of the communication device 10.

At S14, the other system 80 accesses the management device 40 at the predetermined time to obtain the state information indicating the operation state of the communication device 10. For example, the obtained state information may be used to generate an operation status report of the communication device 10 to be sent to a customer. Alternatively, the other system 80 may calculate a charge fee based on the counter value of the communication device 10 that is obtained from the state information.

When the relay device 30 receives a request including the state information from the communication device 10, the relay device 30 may respond to the communication device 10 indicating that the state information is successfully received in response to the request. Further, when the management device 40 completes processing of the state information, which is performed based on the request sent from the communication device 10, the management device 40 may send a response to the communication device 10 through the relay device 30 to indicate that the processing is successfully completed.

Figure 5B:
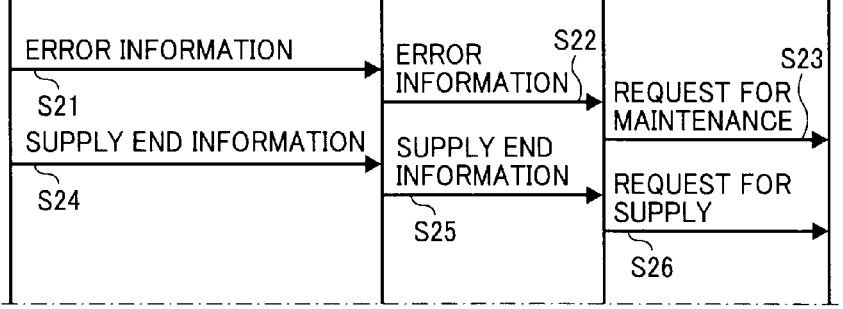
FIG. 5B is a data sequence diagram illustrating operation of sending error information or maintenance information from the communication device to the management device, performed by the communication system of FIG. 1, according to an example embodiment of the present invention.

FIG. 5B illustrates an example case in which the communication device 10 transmits information to the management system 40, which requires immediate attention by the management system 40.

S21 to S23 are performed when an error or a trouble occurs such that the communication device 10 needs to be checked by a service technician.

At S21, when the communication device 10 detects an error or trouble, which needs to be notified to the management device 40 immediately, the communication device 10 transmits notices indicating that the error occurs, such as error information, to the management device 40 through the relay device 30. For example, when the communication device 10 needs to be repaired, the communication device 10 automatically sends error information to the management device 40 to request for a service technician.

At S22, the relay device 30 transfers the error information to the management device 40.

At S23, when the error information is received at the management device 40, the management device 40 analyzes the error information to generate a request for a service technician who can fix the error, and sends the request for service technician to the other system 80, specifically, to a service site that is responsible for managing the communication device 10. Based on the request for service technician, the service site arranges a service technician to be dispatched to the user site where the communication device 10 is located or contact the user of the communication device 10.

S24 to S26 are performed when the communication device 10 detects the end status of a supply such that the communication device 10 needs to order a new supply.

At S24, when the communication device 10 detects the end status of the supply, such as the end status of toner supply, the communication device 10 transmits notices indicating that the end status of a specific supply is detected, such as supply end information, to the management device 40 through the relay device 30.

At S25, the relay device 30 transfers the supply end information to the management device 40.

At S26, when the supply end information is received at the management device 40, the management device 40 analyzes the supply end information to generate a request for a new supply, and sends the request for new supply to the other system 80, specifically, to a service site that is responsible for sending a new supply to the communication device 10. Based on the request for new supply, the service site sends a new supply to the communication device 10 or arranges a service technician to bring a new supply to the communication device 10.

Figure 5C:
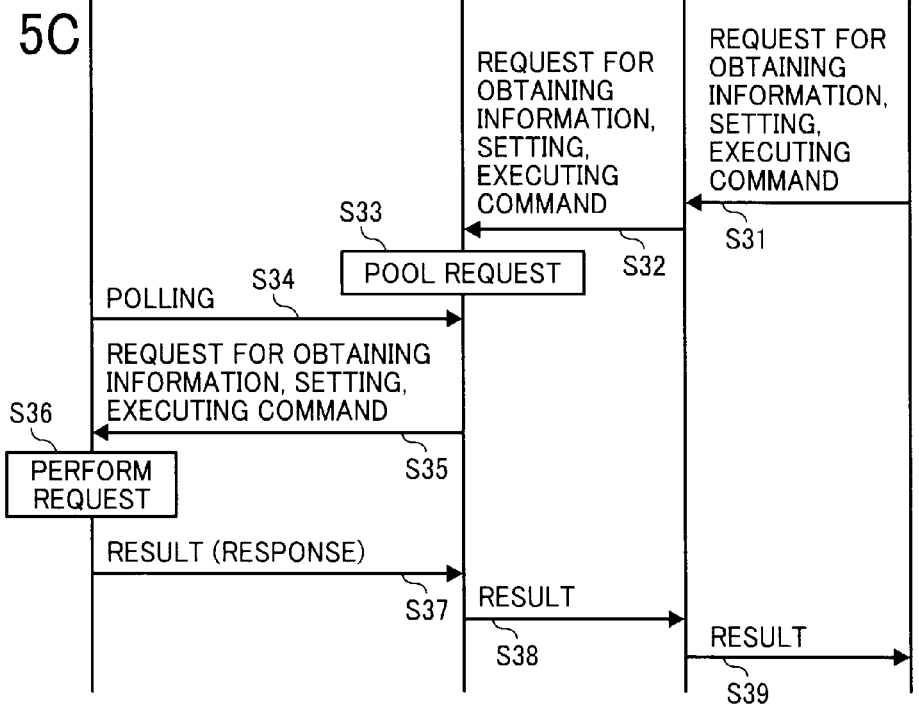
FIG. 5C is a data sequence diagram illustrating operation of sending a request from the management device to the communication device, performed by the communication system of FIG. 1, according to an example embodiment of the present invention.

FIG. 5C illustrates an example case in which the management device 40 sends instructions such as a command to the communication device 10 to request the communication device 10 to execute specific operations according to the command. For example, when an error frequently occurs at a specific communication device 10, or when the user has requested the management device 40 to send a service technician to fix the error or trouble, the other system 80 may want to access the communication device 10 to obtain various data indicating the current state of the communication device 10, change settings of the communication device 10, or cause the communication device 10 to perform test operations. In such case, the other system 80 requests the management device 40 to transmit a request including a command to the communication device 10.

At S31, the other system 80 sends a request for obtaining information, changing setting, or executing a command, which is addressed to the communication device 10, to the management device 40.

At S32, the management device 40 generates a request addressed to the communication device 10, based on the instruction or the request received from the other system 80, and sends the request to the relay device 30 that relays communications between the destination communication device 10 and the management device 40.

At S33, the relay device 30 pools the request received from the management device 40.

When the communication device 10 performs polling at S34, the relay device 30 obtains the request that is pooled for the communication device 10, and transfers the request in response to the polling at S35.

Alternatively, the relay device 30 may transfer the request that is pooled at S33 at any other time when the communication device 10 accesses the relay device 30, for example, when the state information is sent at S11 or the error information is sent at S21.

At S36, the communication device 10, which receives the request from the management device 40, perform processing according to the command in the request to generate a result of executing the command. At S37, the communication device 10 transmits the processing result to the relay device 30 as a response to the request received from the management device 40.

At S38, the relay device 30 transfers the processing result to the management device 40.

At S39, based on the received processing result, the management device 40 sends notification indicating the processing result to the other system 80 that sends the request at S31.

As described above referring to FIG. 5C, the other system 80 is able to obtain information regarding the current operation state of the communication device 10 or any other information desired by the other system 80.

In the above-described example, it is assumed that the other system 80 requests the communication device 10 to obtain information, change settings, or execute a specific operation through the management device 40. In a substantially similar manner, the management device 40 may request the communication device 10 to obtain information, change settings, or execute a specific operation.

Figure 5D:
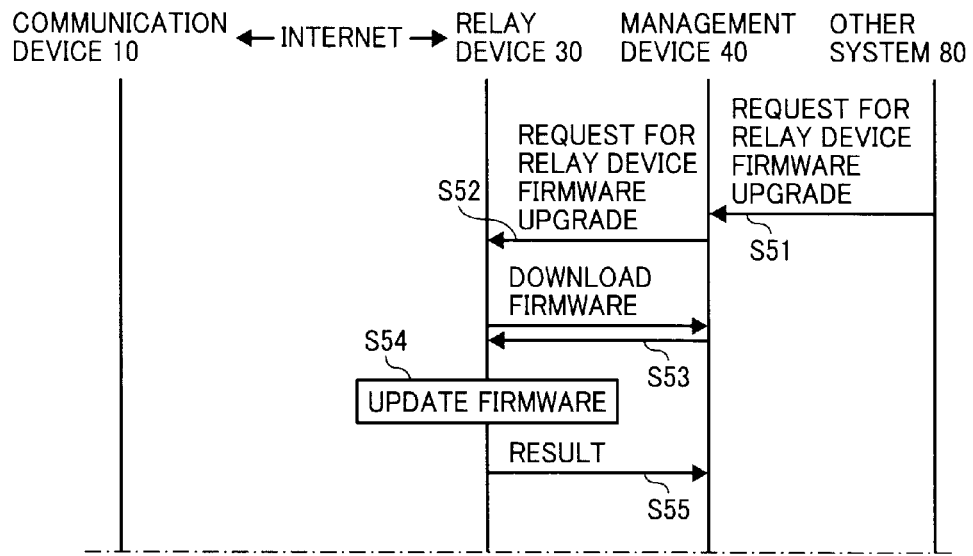
FIG. 5D is a data sequence diagram illustrating operation of sending a request for updating firmware of the relay device, performed by the communication system of FIG. 1, according to an example embodiment of the present invention.

FIG. 5D illustrates an example case in which firmware of the relay device 30 is updated. For example, when a services provider of the communication system of FIG. 1 determines that firmware of the relay device 30 needs to be upgraded to a new version, the services provider requests the management device 40 to instruct firmware upgrade of the relay device 30 through the other system 80.

At S51, the other system 80 sends a request for firmware upgrade of the relay device 30 to the management device 40. The management device 40 stores the new version of firmware in a memory, which is obtained from the other system 80, such that the relay device 30 can download the new version of firmware from the management device 40.

At S52, the management device 40 sends a request for firmware upgrade to all of the relay devices 30 that are managed by the management device 40, or at least the relay devices 30 that are needed to be upgraded.

At S53, the relay device 30, which receives the request for firmware upgrade, executes processing according to the request. More specifically, the relay device 30 accesses the management device 40 to download the new version of firmware.

At S54, the relay device 30 updates firmware using the downloaded new version of firmware.

At S55, the relay device 30 sends a processing result to the management device 40 to notify that firmware upgrade is successfully performed. The management device 40, which receives the processing result from each one of the relay devices 30, may send notification including the processing results of the relay devices 30 to the other system 80.

As described above, since firmware upgrade of the relay device 30 is performed by the services provider within the sites that can be managed by the services provider, polling or pooling the requests is not necessary such that firmware upgrade tends to be completed immediately after the request is generated.

Figure 5E:
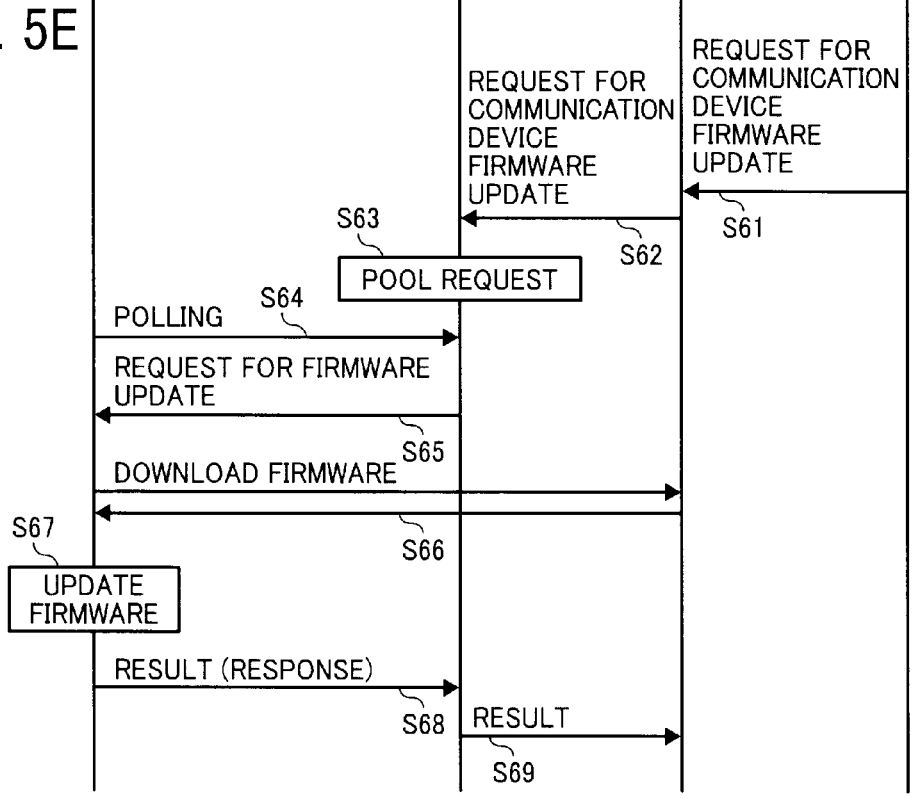
FIG. 5E is a data sequence diagram illustrating operation of sending a request for updating firmware of the communication device, performed by the communication system of FIG. 1, according to an example embodiment of the present invention.

FIG. 5E illustrates an example case in which firmware of the communication device 10 is upgraded. For example, when the services provider of the communication system of FIG. 1 determines that firmware of the communication device 10 needs to be upgraded to a new version, the services provider requests the management device 40 to instruct firmware upgrade of the communication device 10 through the other system 80.

At S61, the other system 80 sends a request for firmware upgrade of the communication device 10 to the management device 40. The management device 40 stores the new version of firmware in a memory, which is obtained from the other system 80, such that the communication device 10 can download from the new version of firmware from the management device 40.

At S62, the management device 40 sends a request for firmware upgrade to all of the communication devices 10 that are managed by the management device 40, or at least the communication devices 10 that are needed to be upgraded, through the relay devices 30.

At S63, each one of the relay devices 30, or the relay device 30, pools the request received from the management device 40.

When the communication device 10 performs polling at S64, the relay device 30 obtains the request and sends the request to the communication device 10 in response to the polling at S65.

At S66, the communication device 10, which receives the request for firmware upgrade, executes processing according to the request. More specifically, the communication device 10 accesses the management device 40 to download the new version of firmware from the management device 40.

AT S67, the communication device 10 updates firmware using the downloaded new version of firmware.

At S68 and S69, the communication device 10 sends a processing result to the management device 40 through the relay device 30 to notify that firmware upgrade is successfully performed. The management device 40, which receives the processing result from each one of the communication devices 10, may send notification including the processing results of the communication devices 10 to the other system 80.

In the above-described example, it is assumed that the communication device 10 accesses the management device 40 to download the new version of firmware. Alternatively, the communication device 10 may access any other device, such as the relay device 30, as long as the new version of firmware is downloadable. The address to be accessed may be specified, for example, by a request for firmware upgrade.

As described above, firmware of the communication device 10, which is provided in the user site, is upgraded in response to the request sent by the management device 40.

In order to allow the communication device 10 and the management device 40 to perform any one of the above-described operations, the allocating device 20 assigns a specific relay device 30 to the communication device 10. The allocating device 20 further manages one or more devices in the communication system of FIG. 1 such that the processing load is equally distributed over the relay devices 30.

Figure 6A:
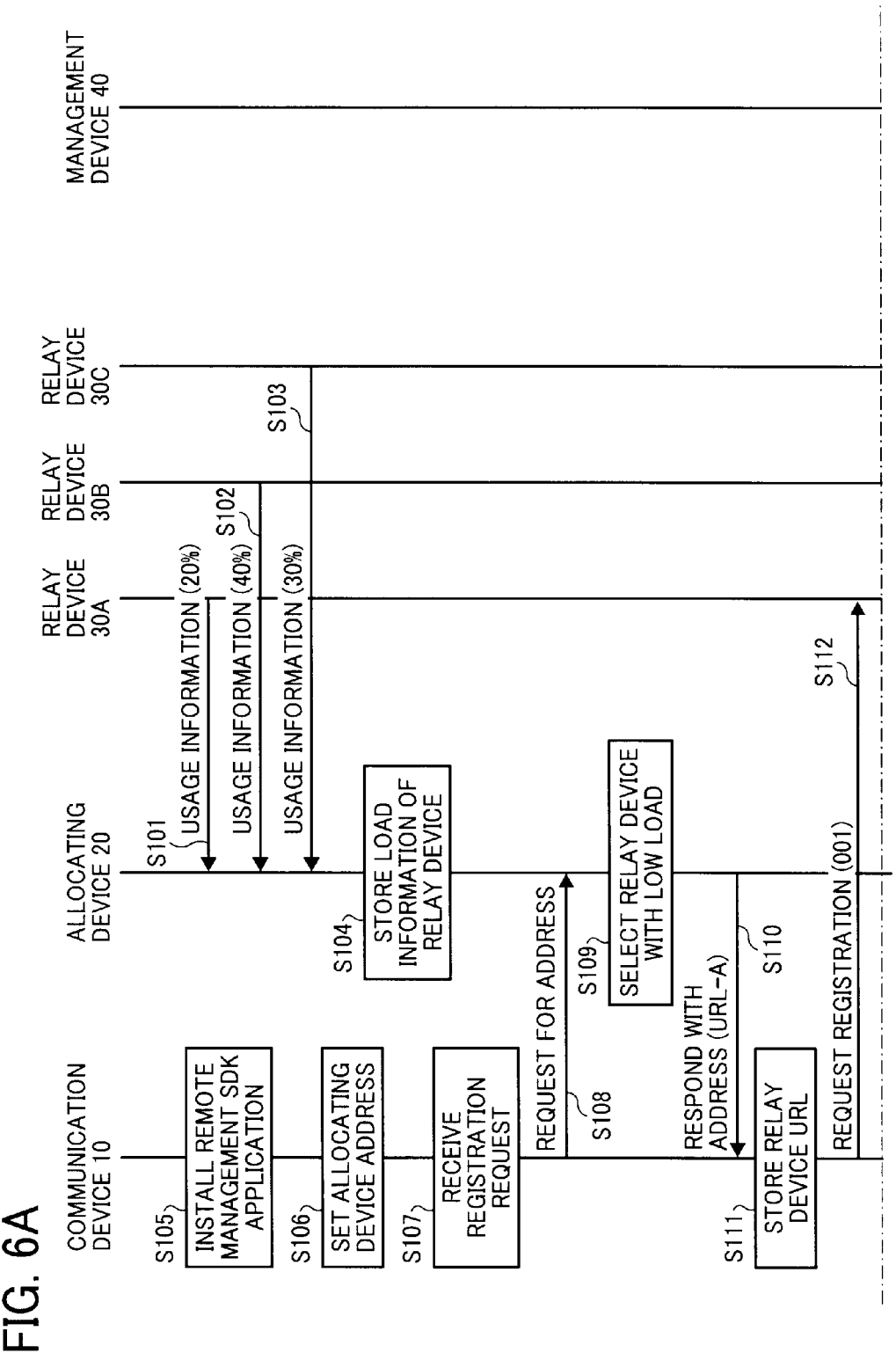
FIGS. 6A and 6B are a data sequence diagram illustrating operation of assigning a relay device to the communication device, which is not assigned with a relay device, to start communication with the management device, performed by the communication system of FIG. 1, according to an example embodiment of the present invention.
Figure 6B:
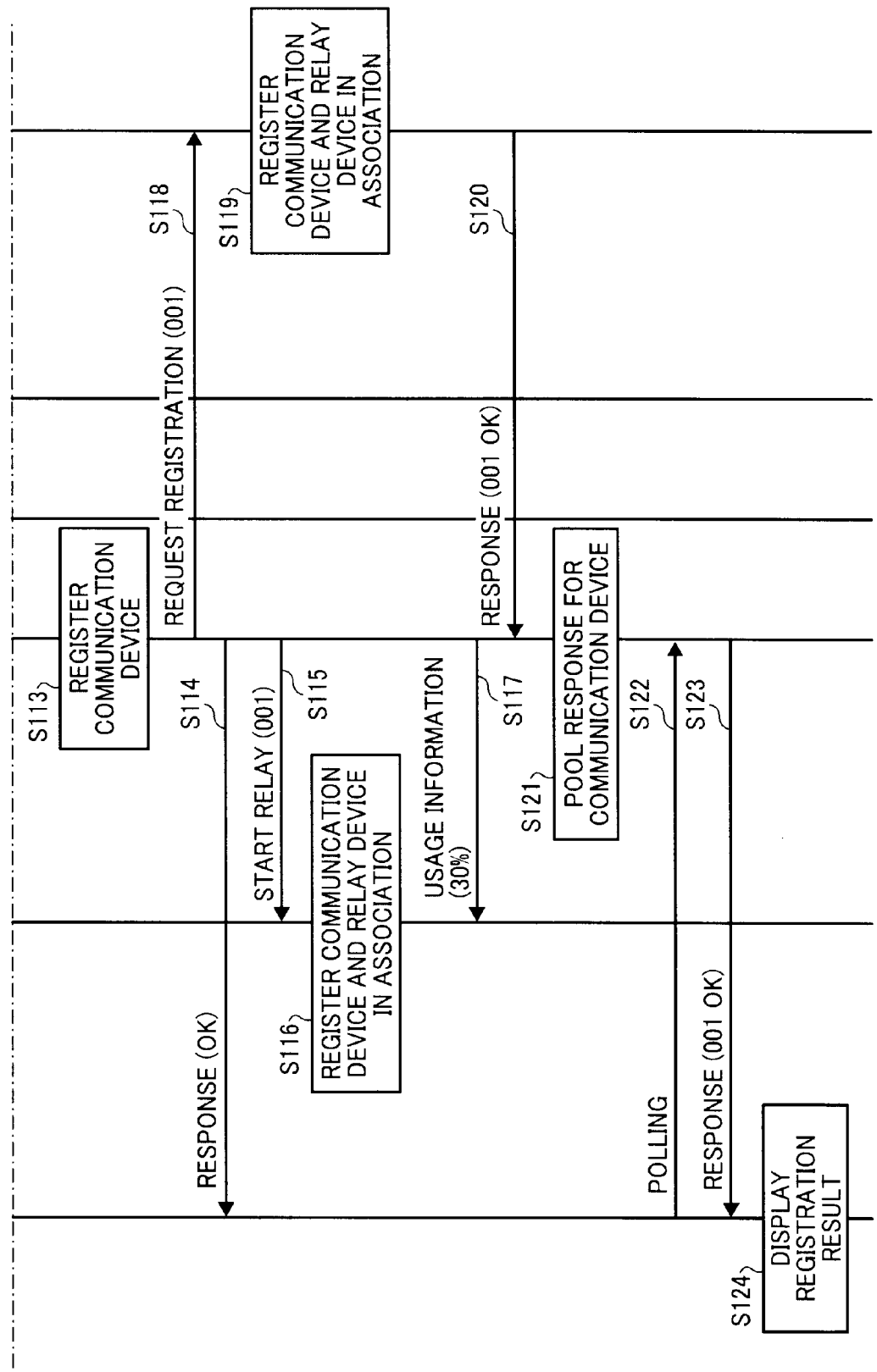

Referring now to FIGS. 6A and 6B, operation of assigning a relay device 30 to a communication device 10 when the remote management SDK application 104 is installed or newly executed onto the communication device 10, is explained according to an example embodiment of the present invention. While FIGS. 6A and 6B shows only one communication device 10, allocation of the relay device 30 is performed for each one of the communication devices 10 to be remotely managed by the center communication device 40. Further, in this example, it is assumed that the relay devices 30A to 30C are managed by the allocating device 20 as a candidate relay device to be assigned to the communication device 10. For the descriptive purposes, the relay devices 30A to 30C are assumed to be provided at the services provider site, which could be any virtual site that can be managed by the services provider. The physical location of each of the relay devices 30A to 30C is not fixed such that any one of the relay devices 30A to 30C may be provided within or outside the country.

At S101 to S103, the relay devices 30A to 30C each send usage information to the allocating device 20 at a predetermined time. For example, when a counter value reaches a predetermined time, the device management module 305 sends usage information to In this example, the relay device 30 is caused to periodically send usage information including processing load information. The processing load information indicates the degree of processing load on the relay device 30 in relaying communications. The usage information may further include any information regarding the usage of the relay device 30 other than the processing load information indicating the degree of processing load.

In FIG. 7, the relay device 30A sends processing load information indicating that 20% of load is on the relay device 30A with respect to its capacity limit. The relay device 30B sends processing load information indicating that 40% of load is on the relay device 30B with respect to its capacity limit. The relay device 30C sends processing load information indicating that 30% of load is on the relay device 30C with respect to its capacity limit.

The processing load on the relay device 30 in relaying communications is obtained based on the degree of a number of communication devices 10 that is assigned to the relay device 30 with respect to its capacity in a number of communication devices 10 that can be assigned, and/or the usage rate of the CPU or memory of the relay device 30. Further, the relay device 30 may be set to send usage information periodically, for example, every one hour. Alternatively, the relay device 30 may be set to send at least processing load information, for example, when the processing load increases or decreases by more than 10% with respect the processing load that was previously sent to the allocating device 20.

When the allocating device 20 receives the usage information from the relay devices 30A to 30C, the allocating device 20 stores the processing load information in a memory, such as the memory 12, for each of the relay devices 30A to 30C. S101 to S104 are performed no matter whether or not the communication device 10 accesses the allocating device 20.

At S105, the communication device 10 installs the remote management SDK application 104 thereon. At S106, the communication device 10 is set with the address of the allocating device 20. At S107, the communication device 10 receives a user instruction for registering the communication device 10 to be subjected for remote management by the management device 40, for example, through the operation device 15.

At S108, the communication device 10 accesses the allocating device 20 using the address of the allocating device 20, which is set at S106, to send an address confirmation request to the allocating device 20. The address confirmation request requests the allocating device 20 to assign the communication device 10 with the relay device 30 that relays communications between the communication device 10 and the management device 40. With the request, the communication device 10 may send an ID of the communication device 10 and/or a contract number of a remote management contract relating to the communication device 10 to the allocating device 20.

At S109, the allocating device 20 selects one of the relay devices 30A to 30C based on the processing load information that is stored at S104 to assign the selected relay device 30 to the communication device 10 that sends the request. In this example, the allocating device 20 selects one of the relay devices 30 having a low processing load. This causes the processing load to be distributed over the relay devices 30 such that the processing load is balanced, thus suppressing downtime of the system that may be otherwise caused as the load is concentrated on a specific relay device 30. Accordingly, the communication system is able to perform operations more smoothly.

At S110, the allocating device 20 sends identification information of the relay device 30 that is assigned to the communication device 10 at S109, to the communication device 10 in response to the address confirmation request. The identification information of the relay device 30 includes, for example, an address of the relay device 30, and/or an ID and a password that may be used to log in the relay device 30. In FIG. 6, it is assumed that the relay device 30A is assigned to the communication device 10. At S110, the allocating device 20 sends the URL address of the relay device 30A, "URL-A", to the communication device 10.

When the response with the identification information of the relay device 30 is received, at S111, the communication device 10 stores the received identification information ("URL-A") of the relay device 30A in a memory such a the memory 12, as information to be used for accessing the relay device 30 to communicate with the management device 40.

At S112, the communication device 10 accesses the relay device 30A using the identification information of the relay device 30A read out from the memory, and sends a request for registering the communication device 10 to be remotely managed by the management device 40.

When the relay device 30A receives the request for registration from the communication device 10, the relay device 30A may determine whether the communication device 10 is an authenticated device that is allowed to be managed by the management device 40. When it is determined that the communication device 10 is the authenticated device, at S113, the relay device 30A registers the communication device 10 as a device subjected for relaying processing. At S114, the relay device 30A sends a response indicating that the request for registration is successfully received, to the communication device 10.

For example, the relay device 30A may request the communication device 10 to send an ID and a password, which is received with the identification information of the relay device 30A, to the relay device 30A. Using the ID and the password, the relay device 30A determines whether the communication device 10 is an authenticated device.

At S115, the relay device 30A sends notification indicating that the communication device 10 is newly registered to be managed by the relay device 30A, to the allocating device 20. More specifically, with the request, the relay device 30A sends identification information "001" of the communication device 10 to notify that relaying of communications for the communication device 10 is started.

When the notification indicating start of relaying communications is received, at S116, the allocating device 20 stores the communication device 10 and the relay device 30A in association with each other.

At S117, the relay device 30A further calculates the processing load on the relay device 30A in relaying communications, since the communication device 10 is added as a device subjected for management in relaying communications. The relay device 30A sends updated usage information that reflects the recalculated processing load to the allocating device 20.

At S118, the relay device 30A transfers the request for registration, which is received from the communication device 10, to the management device 40.

At S119, the management device 40 registers the communication device 10 as a device for remote management, and the relay device 30A that sends the request for registration from the communication device 10 as the relay device 30A that relays communications for the communication device 10, in association with each other.

At S120, the management device 40 sends a result of registering the communication device 10 to the relay device 30A, as a response to be transmitted to the communication device 10.

At S121, the relay device 30A temporarily pools the response received from the management device 40.

When the communication device 10 performs polling at S122, the relay device 30A transfers the response that is pooled to the communication device 10 in response to the request for registration.

At S124, the communication device 10, which receives the result of registering the communication device 10, causes a display, such as the display 14, to display that the registration process is completed to the user.

As described above, the allocating device 20 is able to assign the most desirable relay device 30 to the communication device 10 when the communication device 10 accesses the communication system. Through the relay device 30, the communication device 10 is able to communicate with the management device 40 to be remotely managed by the management device 40.

More specifically, the allocating device 20 receives processing load information indicating the degree of processing load on the relay device 30 in relaying communications from each one of the relay devices 30. Based on the processing load information, the allocating device 20 selects the relay device 30 that is low in processing load, and assigns the selected relay device 30 to the communication device 10. This suppresses the processing load from being concentrated onto a specific relay device 30, thus suppressing downtime of the communication system. Accordingly, the communication system becomes more stabilized.

Any one of the above-described steps may be performed in an order different from the order described above. For example, S114, S115, S117, and S118 may be performed in an order different from this order.

Referring now to FIG. 7, operation of notifying the management device 40 of counter information indicating a counter value of the communication device 10, performed by the communication system of FIG. 1, is explained according to an example embodiment of the present invention. The operation of FIG. 7 is performed when the communication device 10 determines that a counted timer value reaches a predetermined time, which is previously set as the time for sending counter information to the management device 40. For example, the relay device 30 may send information regarding the time for sending counter information to the communication device 10 to cause the communication device 10 send counter information at the predetermined time.

At S131, the communication device 10 collects counter values of various devices in the communication device 10 to generate counter information, and sends the counter information addressed to the management device 40 to the relay device 30A, which is stored in the memory at S111 of FIG. 6. With the counter information, the communication device 10 sends identification information of the communication device 10, such as the ID "001", in the form of a request. At S132, the relay device 30A sends the request including the counter information and the ID that are received from the communication device 10 to the management device 40.

At S133, the management device 40 registers the counter information of the communication device 10 as information regarding the communication device 10. When this registration of the counter information is successfully completed, at S134, the management device 40 sends a response indicating that registration of counter information is completed to the relay device 30A, in response to the request including the counter information.

In case there is a delay in processing the request at the management device 40, the communication device 10 may no longer be assigned to the relay device 30A since the allocation of the relay device 30 may change over time. In view of this, at S133, the management device 40 may search for the relay device 30 that is currently associated with the communication device 10 using the ID of the communication device 10 to identify the relay device 10 to which the response is to be transmitted.

When the response is received at the relay device 30A, at S135, the relay device 30A pools the response. When the communication device 10 performs polling at S136, at S137, the relay device 30A obtains the response addressed to the communication device 10 and sends the response to the communication device 10.

As described above referring to FIG. 7, the communication device 10 is able to send the counter information to the management device 40 through the relay device 30A, which is assigned by the allocating device 20.

Figure 8A:
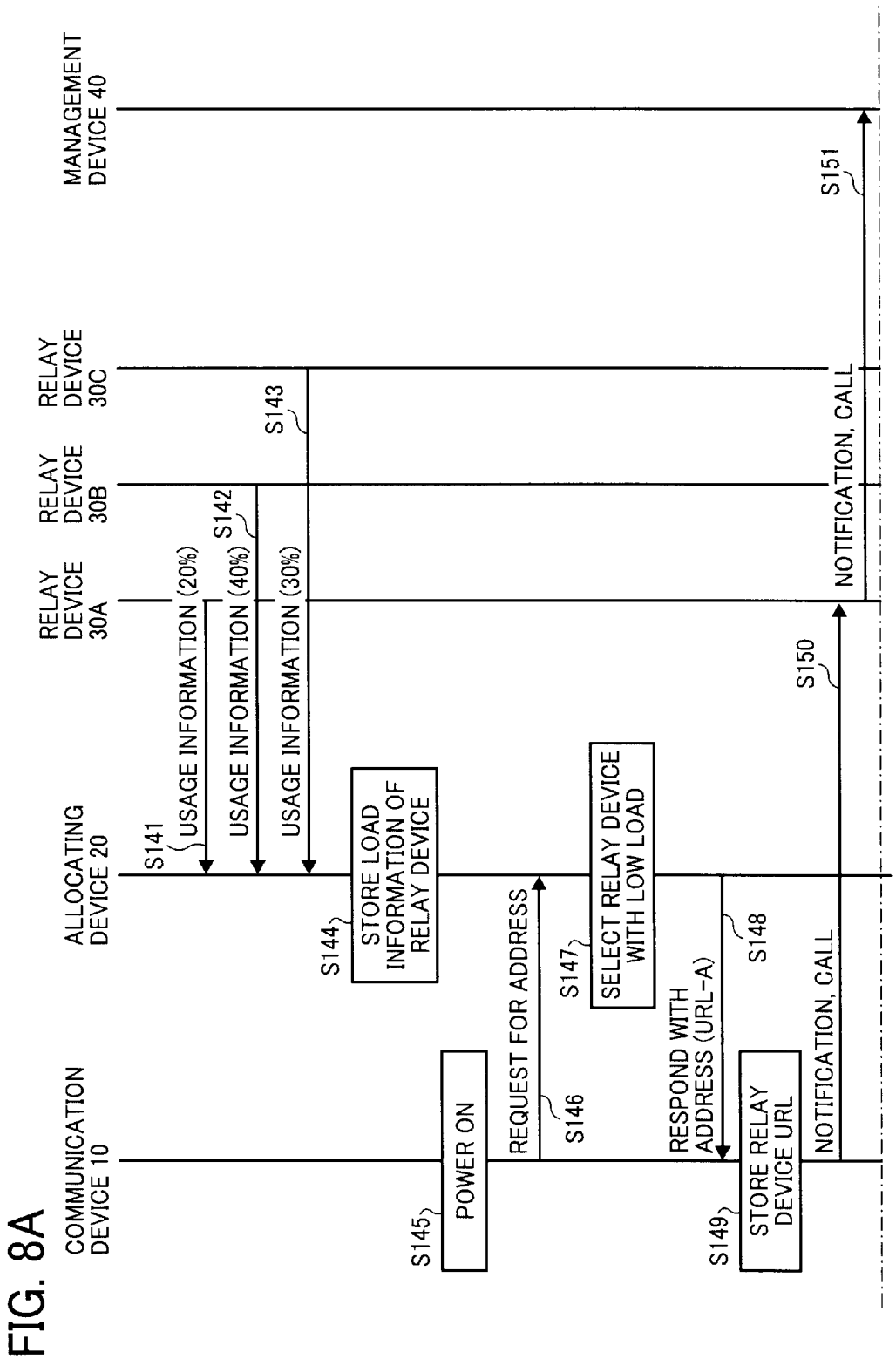
FIGS. 8A and 8B are a data sequence diagram illustrating operation of changing the allocation of a relay device to the communication device that is assigned with the relay device, performed by the communication system of FIG. 1, according to an example embodiment of the present invention.
Figure 8B:
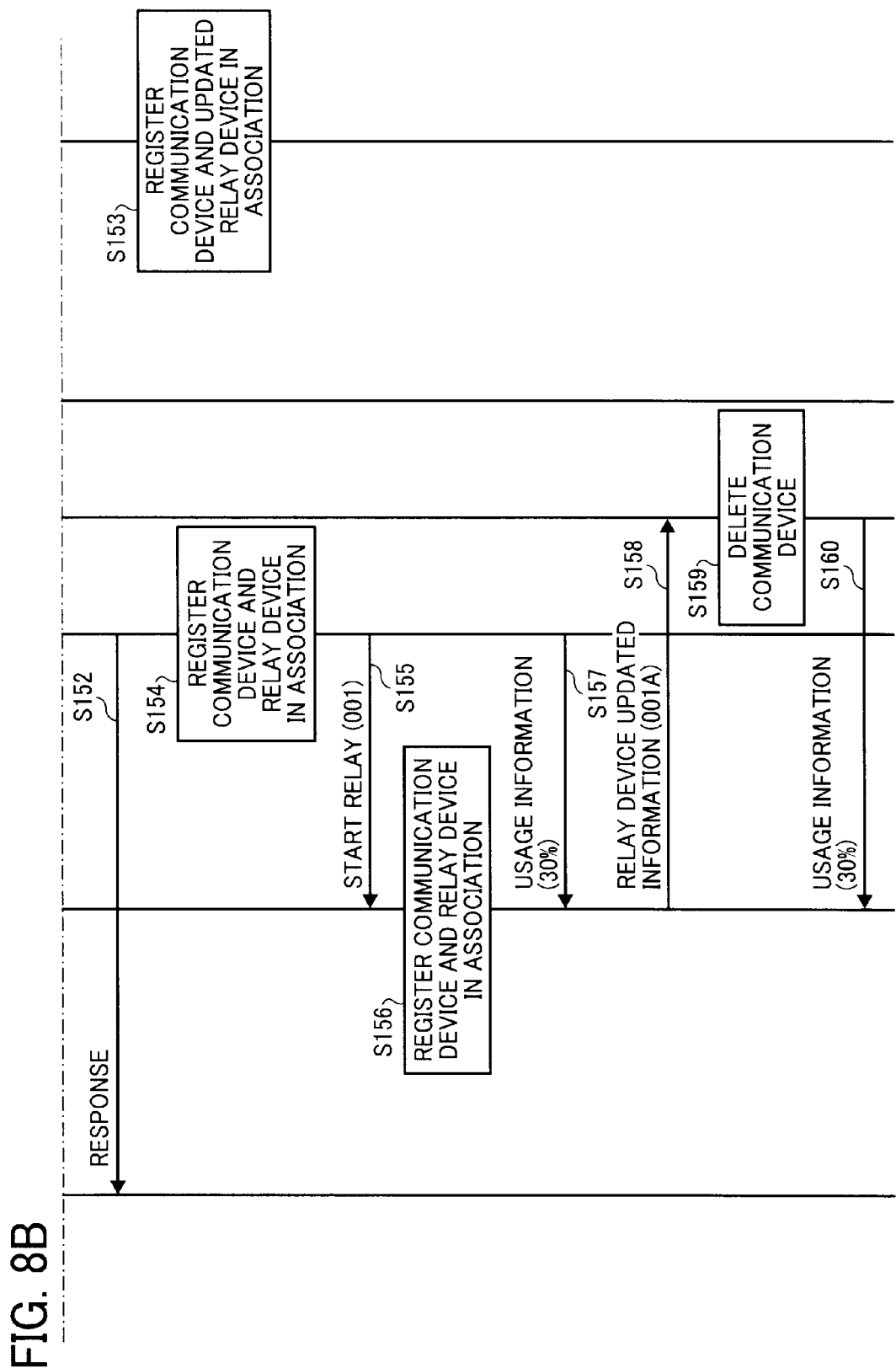

Referring now to FIGS. 8A and 8B, operation of changing the allocation of the relay device 30 to the communication device 10, performed by the communication system of FIG. 1, is explained according to an example embodiment of the present invention. In this example, it is assumed that the communication device 10 turns off its power, after the communication device 10 is assigned with a specific relay device 30, for example, through performing operation of FIGS. 6A and 6B.

At S141 to S143, the relay devices 30A to 30C each send usage information including the processing load information to the allocating device 20 at a predetermined time, in a substantially similar manner as described above referring to S101 to S103 of FIG. 6A.

When the allocating device 20 receives the usage information from the relay devices 30A to 30C, at S144, the allocating device 20 stores at least the received processing load information in the memory for each of the relay devices 30A to 30C.

At S145, the communication device 10 turns on its power such that the remote management SDK application 104 is executed. It is assumed that the communication device 10 is previously assigned with the relay device 30B.

At S146, the communication device 10 accesses the allocating device 20 using the address of the allocating device 20, which is set at S106 of FIG. 6A, to send an address confirmation request to the allocating device 20.

At S147, the allocating device 20 selects one of the relay devices 30A to 30C based on the processing load information that is stored at S144 to assign the selected relay device 30 to the communication device 10 that sends the request, in a substantially similar manner as described above referring to S109 of FIG. 6A.

At S148, the allocating device 20 sends identification information of the relay device 30 that is assigned to the communication device 10 at S147, to the communication device 10 in response to the address confirmation request. In this example, it is assumed that the relay device 30A is assigned to the communication device 10, which has the URL address "URL-A". Accordingly, the allocating device 20 sends the "URL-A" of the relay device 30A to the communication device 10.

At S149, the communication device 10 stores the received identification information ("URL-A") of the relay device 30A in the memory, as information to be used for accessing the relay device 30 to communicate with the management device 40.

More specifically, in this example, the communication device 40 stores the identification information of the relay device 30A that is currently assigned in the memory, not matter whether the communication device 40 is previously assigned with the relay device 30B. Based on the identification information stored at S149, at S150 to S152, the communication device 10 accesses the relay device 30A to start communication with the management device 40, in a substantially similar manner as described above referring to S112, S118, and S114 of FIGS. 6A and 6B.

In prior to receiving the notification from the communication device 10 through the relay device 30A at S151, the management device 40 stores the communication device 10 and the relay device 30B in association with each other to reflect the previous allocation of the relay device 30B to the communication device 10. At S151, when the management device 40 receives notification from the communication device 10 through the relay device 30A, which is different from the relay device 30B that is registered, the management device 10 determines that allocation of the relay device 30 to the communication device 10 has changed. To reflect the current allocation of the relay device 30, at S153, the management device 40 updates the allocation information by registering the relay device 30A in association with the communication device 10.

Similarly, when the notification is received from the communication device 10 at S150, at S154, the relay device 30A determines that the communication device 10 is assigned to the relay device 30A as a device to be managed in relaying communications. At S154, the relay device 30A registers the communication device 10 as the device to be managed by the relay device 30A.

At S155, the relay device 30A sends notification indicating that the communication device 10 is newly registered to be managed by the relay device 30A, to the allocating device 20, in a substantially similar manner as described above referring to S115 of FIG. 6B.

At S157, the relay device 30A further calculates the processing load on the relay device 30A in relaying communications, since the communication device 10 is added as a device to be managed. The relay device 30A sends updated usage information that reflects the recalculated processing load to the allocating device 20.

When the notification indicating start of relaying communications is received at S155, at S156, the allocating device 20 stores the communication device 10 and the relay device 30A in association with each other.

Further, at S156, the allocating device 20 is able to know that the relay device 30B, which is previously assigned to the communication device 10, is no longer assigned to the communication device 10 in relaying communications. At S158, the allocating device 20 sends relay device updated information to the relay device 30B, which indicates that the relay device 30A is now assigned to the communication device 10. For example, the relay device updated information includes the ID "001A" of the relay device 30A and the ID "001" of the communication device 10.

When the relay device updated information is received, at S159, the relay device 30B deletes the communication device 10 from a list of devices that are managed by the relay device 30B in relaying communications.

At S160, the relay device 30B further calculates the processing load on the relay device 30B in relaying communications since the communication device 10 is deleted. The relay device 30B sends updated usage information that reflects the recalculated processing load to the allocating device 20. When the updated usage information is received, the allocating device 20 updates the processing load information of the relay device 30B based on the received information.

Through performing the operation of FIGS. 8A and 8B when the remote management SDK application 104 of the communication device 10 is executed, the allocating device 20 is able to assign the most desirable relay device 30 to the communication device 10, such as the relay device 30 having a low processing load. This helps the processing load to be equally distributed over the relay devices 30, thus stabilizing the communication system.

Further, when the allocating device 20 assigns the communication device 10 with the relay device 30, which is different from the relay device 30 that is previously assigned, the allocating device 20 sends notification to the previously assigned relay device 30 to indicate that the communication device 10 is no longer assigned as a device to be managed by the previously assigned relay device. Based on this notification, the previously assigned relay device 30 is able to recalculate the processing load, and sends the recalculated processing load to the allocating device 20.

Figure 9A:
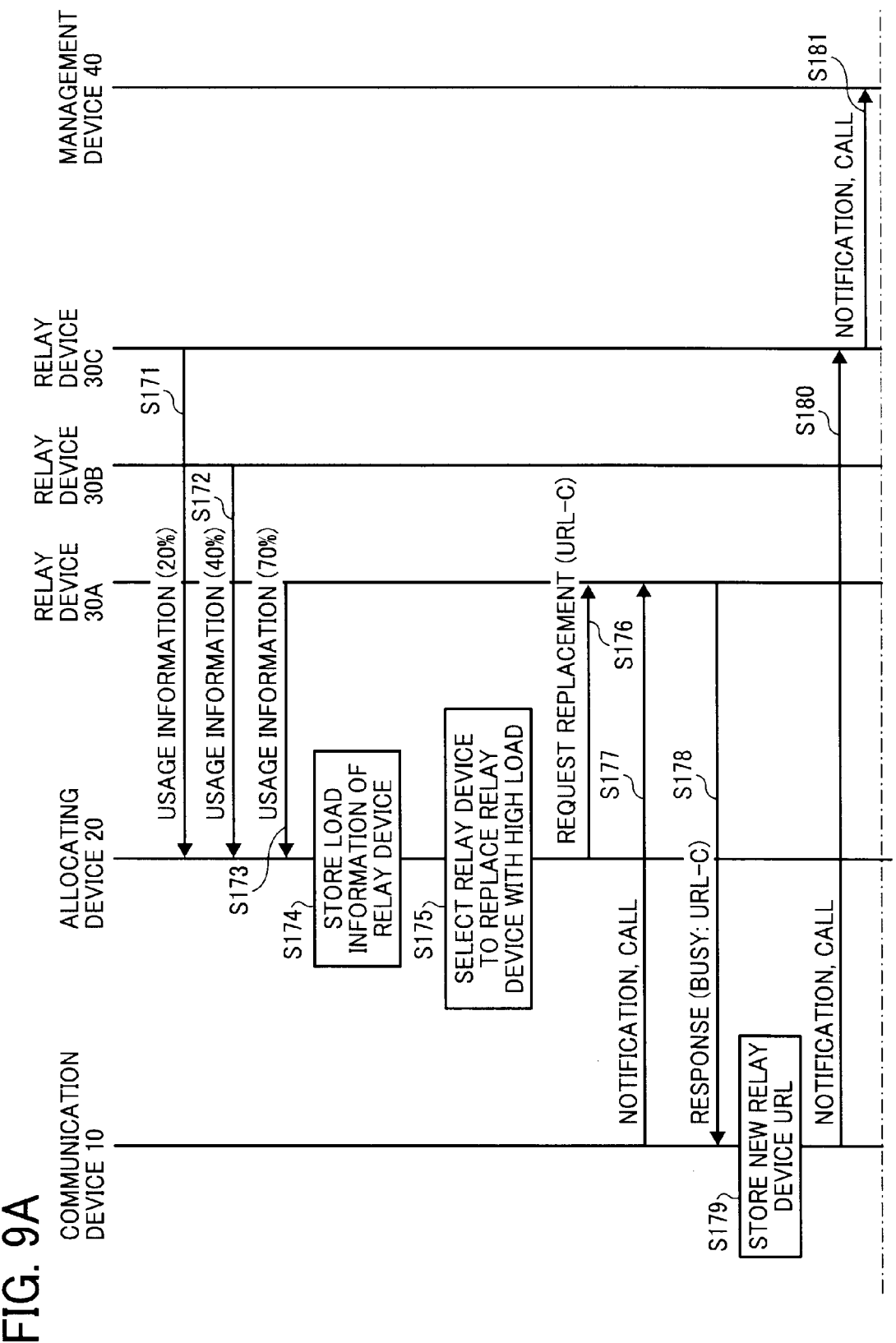
FIGS. 9A and 9B are a data sequence diagram illustrating operation of changing the allocation of a relay device to the communication device that is assigned with the relay device, performed by the communication system of FIG. 1, according to an example embodiment of the present invention.
Figure 9B:
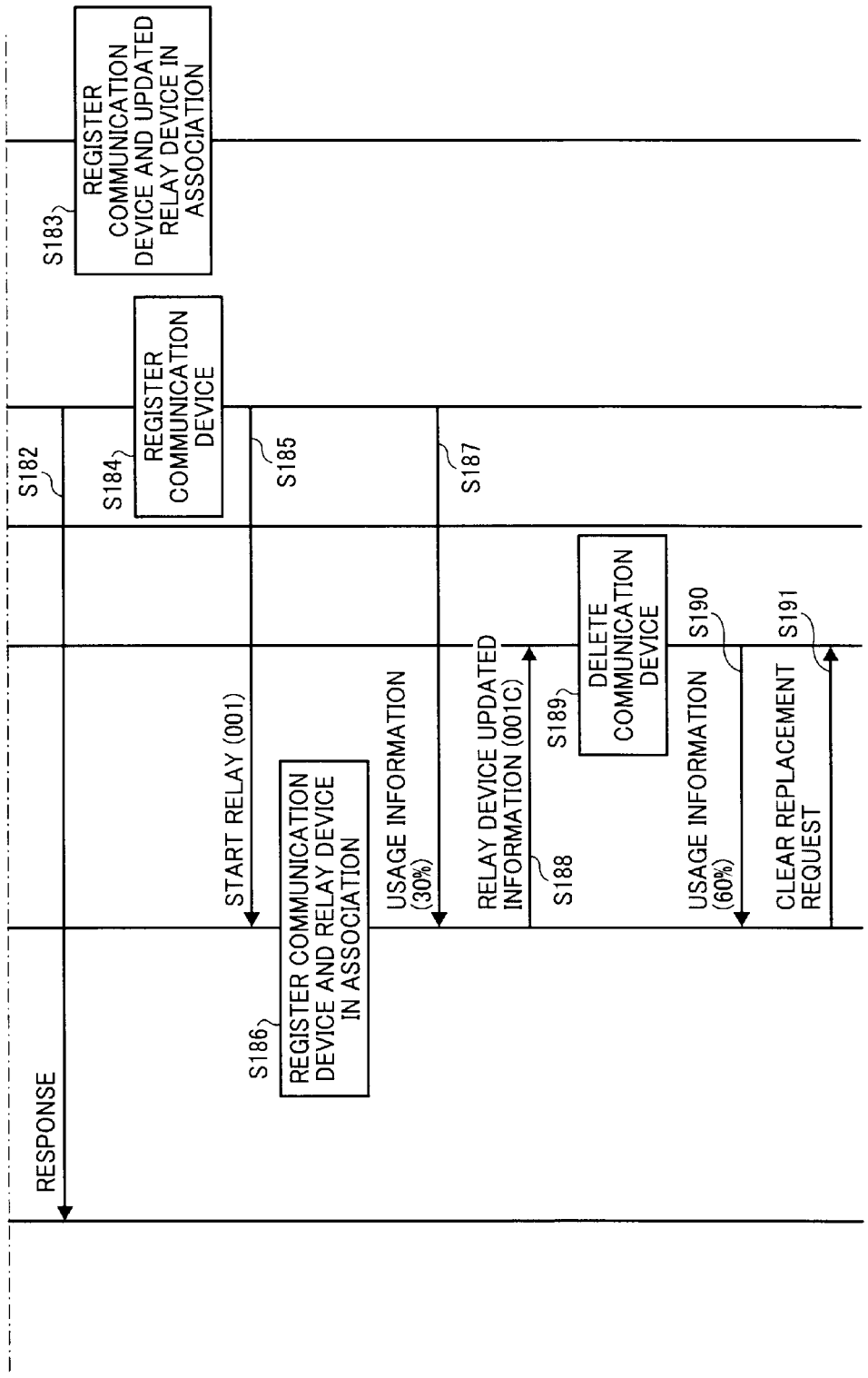

Referring now to FIGS. 9A and 9B, operation of changing allocation of the relay device 30 to the communication device 10, performed by the communication system of FIG. 1, is explained according to an example embodiment of the present invention. In this example, through changing the allocation, the allocating device 20 suppresses the processing load from being concentrated on a specific relay device 30, thus evenly distributing the processing load over the relay devices 30.

At S171 to S173, the relay devices 30A to 30C each send usage information including processing load information to the allocating device 20 at a predetermined time, in a substantially similar manner as described above referring to S101 to S103 of FIG. 6A.

When the allocating device 20 receives the usage information from the relay devices 30A to 30C, at S174, the allocating device 20 stores at least the received processing load information in the memory for each of the relay devices 30A to 30C.

At S175, the allocating device 20 determines whether any one of the relay devices 30A to 30C has the processing load that has exceeded a predetermined threshold level. When it is determined that at least one of the relay devices 30A to 30C has the processing load that has exceeded the predetermined threshold level, the allocating device 20 balances the processing loads on the relay devices 30, for example, by changing the allocation of the relay device 30 to the communication device 10.

In this example, it is determined that the relay device 30A having the processing load of 70% exceeded the threshold level. The allocating device 20 selects one of the relay devices 30 having the processing load that is lower than the threshold level, such as the relay device 30C having the lowest processing load of 20%. To reduce the processing load onto the relay device 30A, the allocating device 20 assigns the relay device 30C to the communication device 10, in replace of the relay device 30A.

At S176, the allocating device 20 sends a request for replacement to the relay device 30A having the high processing load. The request for replacement requests the relay device 30A to transfer the work related to relaying communications for the communication device 10, to the relay device 30C. The request for replacement includes identification information of the relay device 30C to which the work is transferred, such as the URL address "URL-C" of the relay device 30C. The identification information of the relay device 30C is later transmitted to the communication device 10 through the relay device 30A to allow the communication device 10 to access the relay device 30C.

Assuming that the communication device 10 sends notification to the relay device 30A at S177, at S178, the relay device 30A sends a response indicating that the relay device 30A is not available such that the communication device 10 should access the relay device 30C. The response includes the URL address "URL-C" of the relay device 30C.

When the response is received, at S179, the communication device 10 stores the identification information of the newly assigned relay device 30C, such as the URL address "URL-C" of the relay device 30C, in the memory.

At S180 to S182, the communication device 10 accesses the relay device 30C using the identification information of the relay device 30C to start communication with the management device 40 through the relay device 30C, in a substantially similar manner as described above referring to S150 to S152 of FIGS. 8A and 8B.

At S183, when the management device 40 receives notification from the communication device 10 through the relay device 30C, which is different from the relay device 30A that is previously registered for the communication device 10, the management device 10 determines that allocation of the relay device 30 to the communication device 10 has changed. To reflect the current allocation of the relay device 30, at S183, the management device 40 updates the stored allocation information by registering the relay device 30C in association with the communication device 10.

Similarly, when the notification is received from the communication device 10 at S180, at S184, the relay device 30C determines that the communication device 10 is assigned to the relay device 30C as a device to be managed in relaying communications. At S184, the relay device 30C registers the communication device 10 as the device to be managed by the relay device 30C.

At S185, the relay device 30C sends notification indicating that the communication device 10 is newly registered to be managed by the relay device 30C, to the allocating device 20, in a substantially similar manner as described above referring to S115 of FIG. 6B.

At S187, the relay device 30C further calculates the processing load on the relay device 30C in relaying communications, since the communication device 10 is added as a device to be managed. The relay device 30C sends updated usage information that reflects the recalculated processing load to the allocating device 20.

When the notification indicating start of relaying communications is received at S185, at S186, the allocating device 20 stores the communication device 10 and the relay device 30C in association with each other to update the allocation information.

Further, at S188, the allocating device 20 sends relay device updated information to the relay device 30A, which indicates that the relay device 30C is now assigned to the communication device 10 in a substantially similar manner as described above referring to S158 of FIG. 8B. For example, the relay device updated information includes the ID "001C" of the relay device 30C and the ID "001" of the communication device 10.

When the relay device updated information is received, at S189, the relay device 30A deletes the communication device 10 from a list of devices that are managed by the relay device 30A in relaying communications.

At S190, the relay device 30A further calculates the processing load on the relay device 30A in relaying communications, and sends updated usage information that reflects the recalculated processing load to the allocating device 20.

Based on the updated usage information from the relay device 10A that includes the updated processing load information, the allocating device 20 determines whether the processing load of the relay device 30A is lower than a predetermined threshold level. When it is determined that the processing load is lower than the predetermined threshold level, at S191, the allocating device 20 sends a request for clearing the replacement request, which is sent at S176, to the relay device 30A.

When the request for clearing the replacement request is received, the relay device 30A operates in a substantially similar manner as the relay device 30A used to operate before the replacement request is received. More specifically, the relay device 30A does not send a response indicating that the relay device 30A is not available, when the request for relaying is received from the communication device 10.

At S190, when it is determined that the processing load of the relay device 30A is equal to or higher than the predetermined threshold level, the allocating device 20 does not send the request for clearing the replacement request. In such case, the above-described operation of transferring the work to the relay device 30C is repeated for another communication device 10, which is registered as a device to be managed by the relay device 30A.

Alternatively, the allocating device 20 may send a request for replacement with identification information of another relay device 30. In such case, operation of transferring the work to another relay device 30 is performed in a substantially similar manner as described above.

Through performing the operation of FIGS. 9A and 9B, the allocating device 20 is able to balance the processing loads so as to evenly distribute the processing loads over the relay devices 30, thus stabilizing the communication system. More specifically, when the allocating device 20 determines that the processing load on a specific relay device 30 has exceeded a predetermined threshold level, the allocating device 20 searches for a relay device 30 that is low in processing load. The allocating device 20 sends notification to the high-load relay device 30 to cause the work of the high-load relay device 30 to be transferred to the low-load relay device 30. For example, transferring of the work may be achieved by changing the allocation of the relay device 30 to the communication device 10. This causes the processing loads to be evenly distributed over the relay devices 30.

When the allocating device 20 determines that the processing load on the high-load relay device 30 is less than a predetermined threshold level, the allocating device 20 sends notification to the high-load relay device 30 to stop operation of transferring the work to another relay device 30. The communication device 10, which has not accessed the high-load relay device 30 for a time period between the time at which the request for replacement is sent and the time at which the request for cancellation of the replacement request, does not have to change the relay device 30 to be accessed. Since the operation of transferring the work from the high-load relay device 30 to the low-load relay device 30 is stopped when the processing load of the high-load relay device 30 becomes less than the predetermined threshold level, the processing loads on the relay devices 30 are kept relatively even among the relay devices 30, thus suppressing the processing loads from being uneven again due to repeatedly performing the operation of changing the allocation. In this example, a threshold level for causing the allocating device 20 to generate a request for replacement is set higher than a threshold level for causing the allocating device 20 to generate a request for clearing the replacement request. Further, any one of the threshold levels may be previously set and stored in the set parameter 308.

Figure 10B:
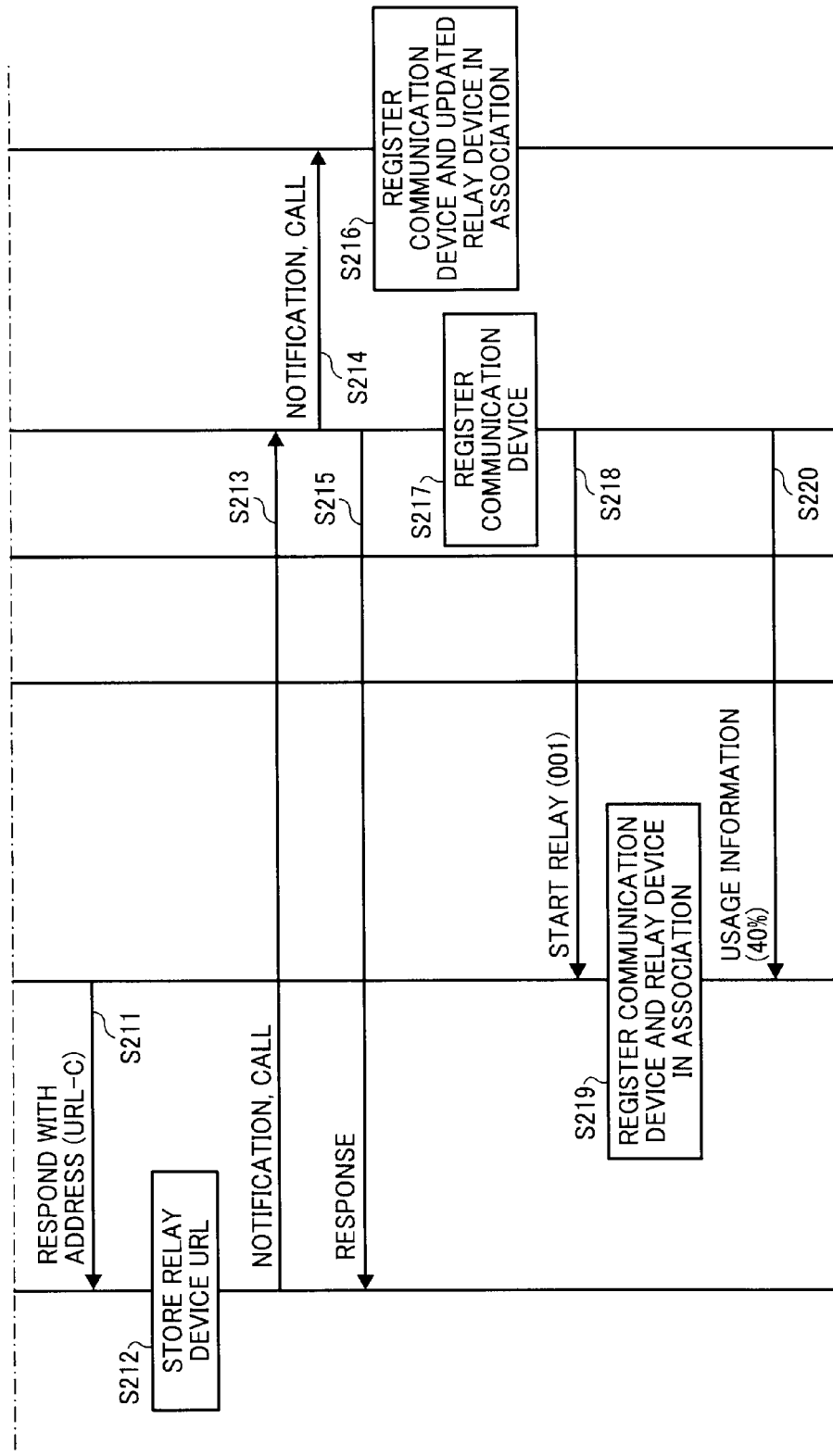

Referring now to FIGS. 10A to 10C, operation of changing allocation of the relay device 30 to the communication device 10, performed by the communication system of FIG. 1, is explained according to an example embodiment of the present invention. In this example, the allocating device 20 changes the allocation of the relay device 30, when a specific relay device 30 temporarily stops providing the relay function, for example, due to maintenance.

Assuming that the relay device 30A stops to provide the relaying function, at S201, the relay device 30A sends notification to the allocating device 20, which indicates that the relay function is stopped. The notification may include information regarding a restart time at which the relay device 30A restarts to provide the relay function. At S202, the relay device 30A stops the relay function.

When the notification to stop is received, at S203, the allocating device 20 deletes the relay device 30A from a list of candidate relay devices 30 that can be assigned to the communication device 10 to relay communications.

In alternative to stopping the relay function, for example, due to maintenance, the relay device 30 may accidentally stop the relay function due to an error. In such case, the relay device 30 may not be able to send notification at S201. Even without notification, the allocating device 20 is caused to periodically receive information, such as usage information, from the relay devices 30. In case the allocating device 20 does not receive any information from the relay device 30 for a predetermined time period, the allocating device 20 determines that the relay function of the relay device 30 is stopped, and deletes the relay device 30 from the list of candidate relay devices 30.

At S204 to S205, the relay devices 30B and 30C each send usage information including processing load information to the allocating device 20 at a predetermined time, in a substantially similar manner as described above referring to S102 to S103 of FIG. 6A.

When the allocating device 20 receives the usage information from the relay devices 30B and 30C, at S206, the allocating device 20 stores at least the received processing load information in the memory for each of the relay devices 30B and 30C.

Assuming that the communication device 10 is previously assigned with the relay device 30A, at S207, the communication device 10 accesses the relay device 30A to communicate with the management device 40 through the relay device 30A.

At S208, the relay device 30A, which stops the relay function, returns an error response or no response to the communication device 10.

Based on the error response or no response, the communication device 10 is able to know that the relay device 10A does not function. At S209, the communication device 10 sends an address confirmation request to the allocating device 20 to request the allocating device 20 to assign another relay device 30 to the communication device 10.

At S210, the allocating device 20 selects one of the relay devices 30B and 30C based on the processing load information that is stored at S206 to assign the selected relay device 30 to the communication device 10 that sends the request, in a substantially similar manner as described above referring to S109 of FIG. 6A.

At S211, the allocating device 20 sends identification information of the relay device 30 that is assigned to the communication device 10 at S210, to the communication device 10 in response to the address confirmation request. In this example, it is assumed that the relay device 30C is assigned to the communication device 10 such that the URL address "URL-C" of the relay device 30C is sent to the communication device 10.

At S212, the communication device 10 stores the received identification information of the relay device 30C in the memory.

At S213 to S215, the communication device 10 accesses the relay device 30C using the identification information of the relay device 30C read out from the memory to start communication with the management device 40, in a substantially similar manner as described above referring to S150 to S152 of FIGS. 8A and 8B.

At S216, when the management device 40 receives notification from the communication device 10 through the relay device 30C, which is different from the relay device 30A that is previously registered, the management device 40 determines that allocation of the relay device 30 to the communication device 10 has changed. To reflect the current allocation of the relay device 30, at S216, the management device 40 updates the stored allocation information by registering the relay device 30C in association with the communication device 10.

Similarly, when the notification is received from the communication device 10 at S213, at S217, the relay device 30C determines that the communication device 10 is assigned to the relay device 30C as a device to be managed in relaying communications. At S217, the relay device 30C registers the communication device 10 as the device to be managed by the relay device 30C.

At S218, the relay device 30C sends notification indicating that the communication device 10 is newly registered to be managed by the relay device 30C, to the allocating device 20, in a substantially similar manner as described above referring to S115 of FIG. 6B.

At S220, the relay device 30C further calculates the processing load on the relay device 30C in relaying communications, since the communication device 10 is added as a device to be managed. The relay device 30C sends updated usage information that reflects the recalculated processing load to the allocating device 20.

When the notification indicating start of relaying communications is received at S218, at S219, the allocating device 20 stores the communication device 10 and the relay device 30C in association with each other to update the allocation information. In this example, however, the allocation information indicating that the relay device 30A is assigned to the communication device 10 is kept stored in the memory. This allows the allocating device 20 to notify the relay device 30A of change in the allocation of relay device 30, when the relay device 30A restarts the relay function.

At S221, the relay device 30A restarts the relay function. At S222, the relay device 30A sends notification indicating that the relay function is restarted to the allocating device 20.

At S223, the allocating device 20 adds the relay device 30A back to the list of candidate relay devices 30 that can be assigned to the communication device 10.

At S224, the allocating device 20 extracts the communication device 10, which is assigned with the new relay device 30C in replace of the relay device 30A when the relay device 30A stops the relay function, by referring to the allocation information stored in the memory.

At S225, the allocating device 20 sends the relay device updated information to the relay device 10A, which includes information regarding the communication device 10 that is extracted at S224. With this relay device updated information, the relay device 30A is able to know that the communication device 10, which is included in the relay device updated information, is now assigned with a new relay device 30.

At S226, the relay device 30A deletes the communication device 10, which is included in the relay device updated information, from a list of devices that are managed by the relay device 30A in relaying communications.

At S227, the relay device 30A further calculates the processing load on the relay device 30A in relaying communications, and sends updated usage information that reflects the recalculated processing load to the allocating device 20.

Through performing the operation of FIGS. 10A to 10C, the allocating device 20 causes the relay device 30, which stops the relay function, to be not assigned with the communication device 10. Further, the allocating device 20 changes the allocation of the relay device 30 even when there is the communication device 10 that is assigned with the relay device 30 that stops the relay function. This helps the communication system to operate more smoothly.

Figure 11B:
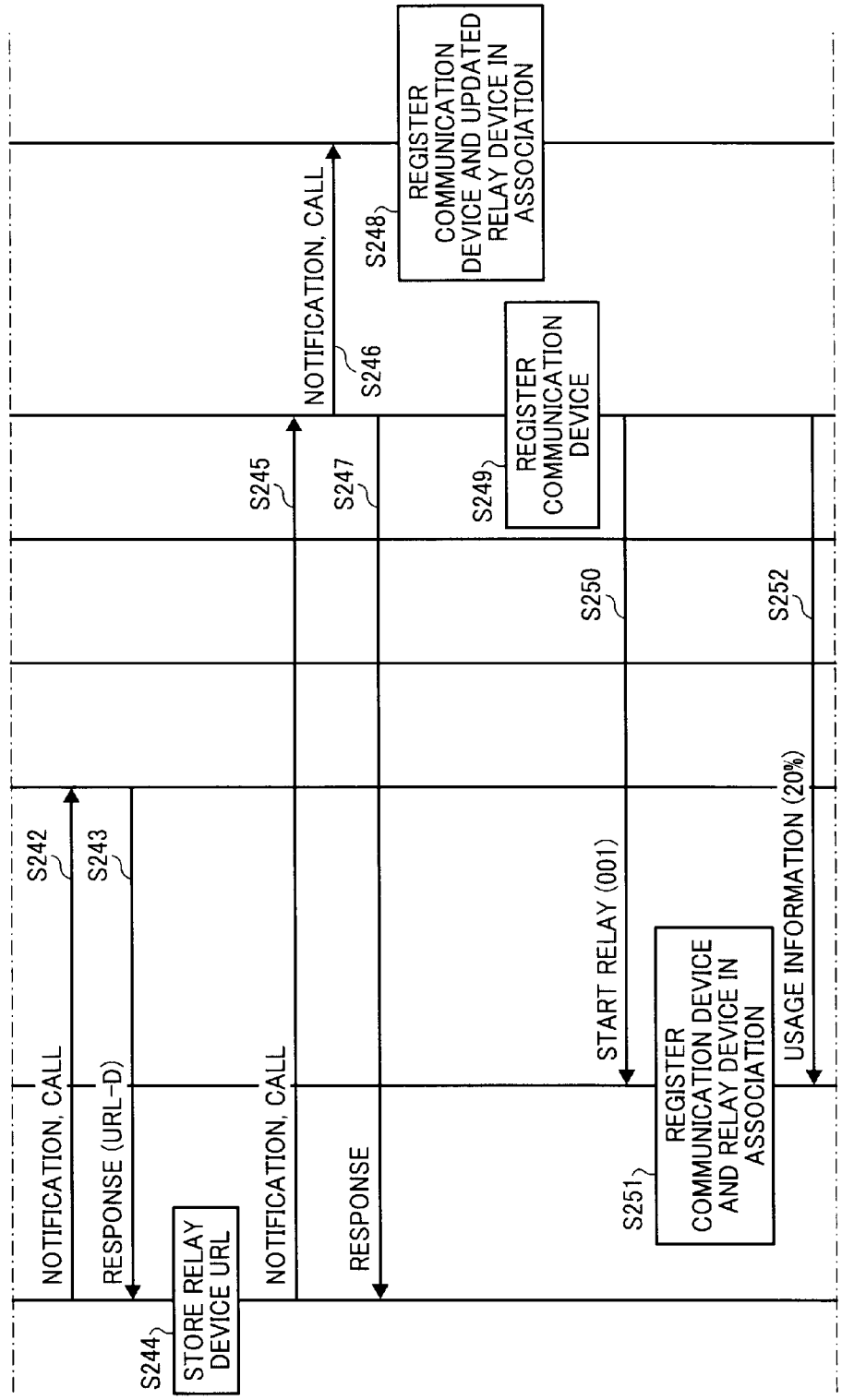
Figure 11C:
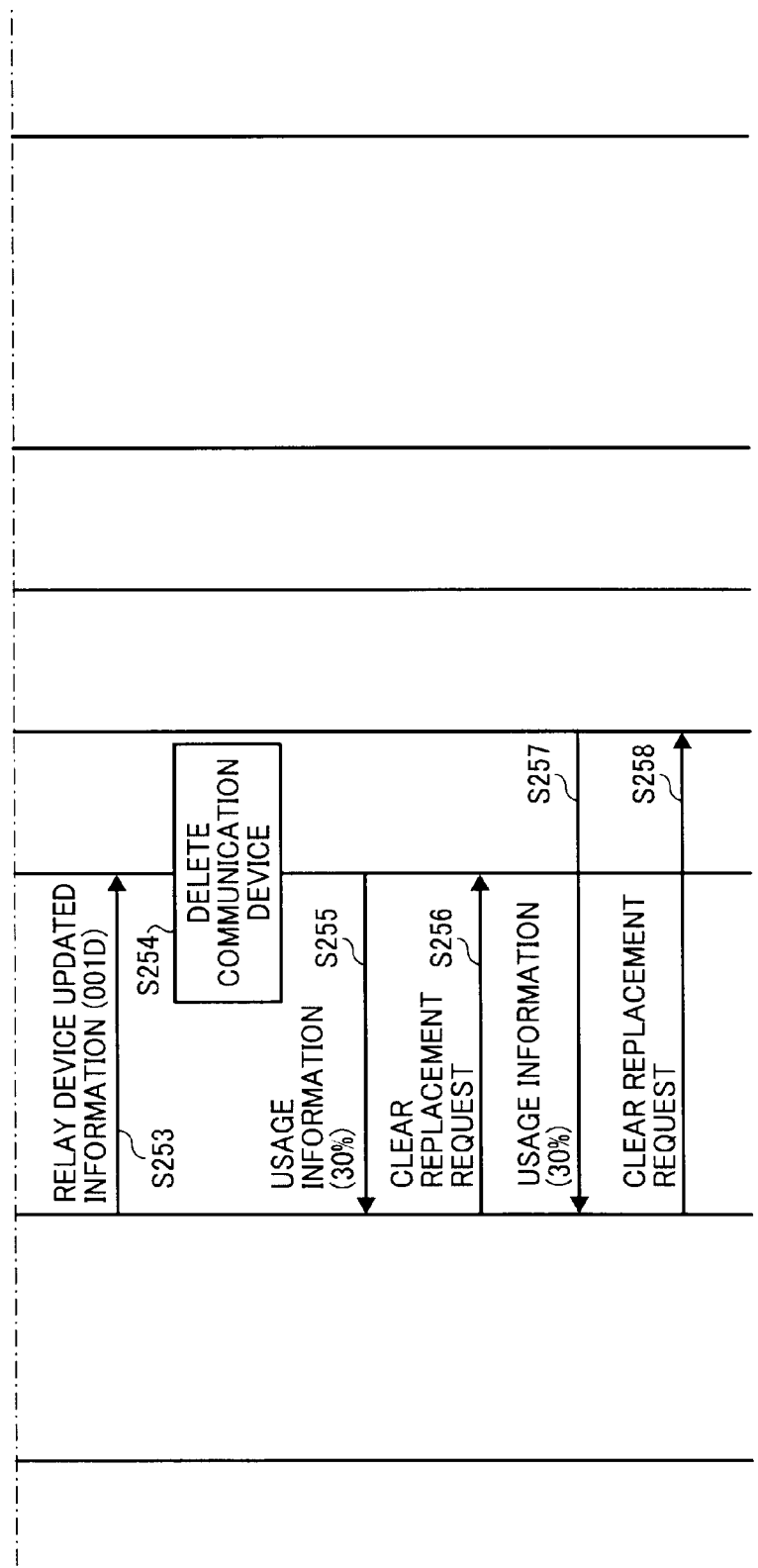

Referring now to FIGS. 11A to 11C, operation of adding the relay device 30 to the communication system of FIG. 1, performed by the communication system of FIG. 1, is explained according to an example embodiment of the present invention. In this example, it is assumed that a relay device 30D is newly added to the relay devices 30A to 30C in the relay system M.

At S231, the relay device 30D, which is newly added to the communication system, sends notification indicating that the relay device 30D is added to the management device 40.

When the management device 40 receives the notification, at S232, the management device 40 registers the relay device 30D as the relay device 30D that relays communications for the management device 40. While performing S232 is optional, registration of the relay device 30 improves the security as the management device 40 may be set to not to accept a request or a response sent from any unregistered relay device 30.

At S233, the relay device 30D sends notification indicating that the relay device 30D is added to the communication system, to the allocating device 20. With this notification, the relay device 30D may send usage information of the relay device 30D to the allocating device 20. Since the relay device 30D is newly added, the processing load is 0%.

When the notification is received, at S234, the allocating device 20 adds the relay device 30D to a list of candidate relay devices 30 that can be assigned to the communication device 10.

At S235 to S237, the relay devices 30A and 30C each send usage information including processing load information to the allocating device 20 at a predetermined time, in a substantially similar manner as described above referring to S101 to S103 of FIG. 6A.

When the allocating device 20 receives the usage information from the relay devices 30A to 30D, at S238, the allocating device 20 stores at least the received processing load information in the memory for each of the relay devices 30A and 30D.

When the relay device 30D is newly added, the allocating device 20 may change the allocation of the communication device 10 to the relay device 30 such that the processing loads on the relay devices 30 are evenly distributed. More specifically, at S239, the allocating device 20 extracts a relay device 30 that is high in processing load. The allocating device 20 sends the request for replacement to the relay device 30 extracted at S239.

More specifically, at S239, the allocating device 20 selects one or more relay devices 30 having the processing load that is higher than a predetermined threshold level. In this example, the threshold level used at S239 is set lower than the threshold level used at S175 of FIG. 9A. Alternatively, the allocating device 20 may select a predetermined number of relay devices 30 having the highest levels of processing load.

In this example, the relay device 30A and the relay device 30B are extracted at S239. At S240 and S241, the allocating device 20 sends the request for replacement to the relay device 30A and the relay device 30B, respectively. The request for replacement includes identification information of the relay device 30D to which the work is transferred, such as the URL address "URL-D" of the relay device 30D.

S242 to S258 are performed in a substantially similar manner as described above referring to S177 to S182 of FIGS. 9A and 9B. For simplicity, FIG. 11B shows an example case for transferring the work from the relay device 30A to the relay device 30D.

More specifically, when the response indicating that the relay device 30A is not available with identification information of the relay device 30D is received, the communication device 10 now accesses the relay device 30D in replace of the relay device 30A, in a substantially similar manner as described above referring to S179 to S182. In a substantially similar manner, the communication device 10 now accesses the relay device 30D in replace of the relay device 30B.

At S248, the management device 40 updates the stored allocation information by registering the relay device 30D in association with the communication device 10, in a substantially similar manner as described above referring to S183 of FIG. 9B. At S249, the relay device 30D registers the communication device 10 as the device to be managed by the relay device 30D. When the notification is received from the relay device 30D at S250, at S251, the allocating device 20 stores the communication device 10 and the relay device 30D in association with each other to update the allocation information.

The above-described operation of updating the allocation information is performed for each one of the communication devices 10 that are managed by the relay device 30A and the relay device 30B.

When the updated usage information is received from the relay device 30A at S255, and the relay device 30B at S257, respectively, the allocating device 20 determines whether the processing load of the relay device 30 is lower than a predetermined threshold level for each one of the relay devices 30A and 30B. When it is determined that the processing load is lower than the predetermined threshold level, at S256 and S258, the allocating device 20 sends a request for clearing the replacement request to the relay device 30A and the relay device 30B, respectively.

Through performing the operation of FIGS. 11A to 11C, the allocating device 20 is able to balance the processing loads so as to evenly distribute the processing loads over the relay devices 30, when the relay device 30 is newly added to the communication system. The operation after S239 may not be performed when there is no relay device 30 that is high in processing load.

Figure 12A:
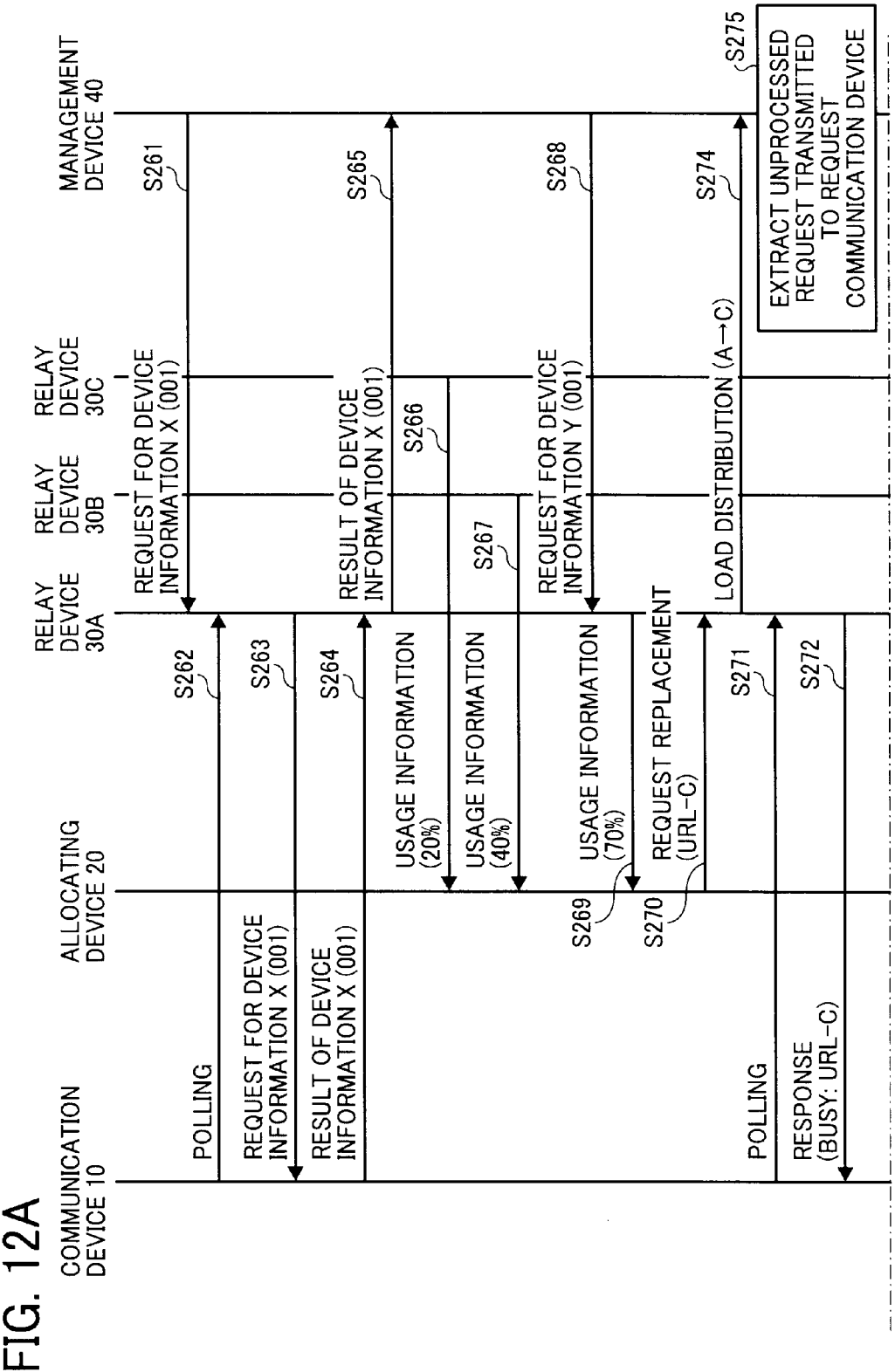
FIGS. 12A to 12C are a data sequence diagram illustrating operation of managing a request transmitted from the management device to the relay device when the allocation of the relay device is changed, performed by the communication system of FIG. 1, according to an example embodiment of the present invention.
Figure 12B:
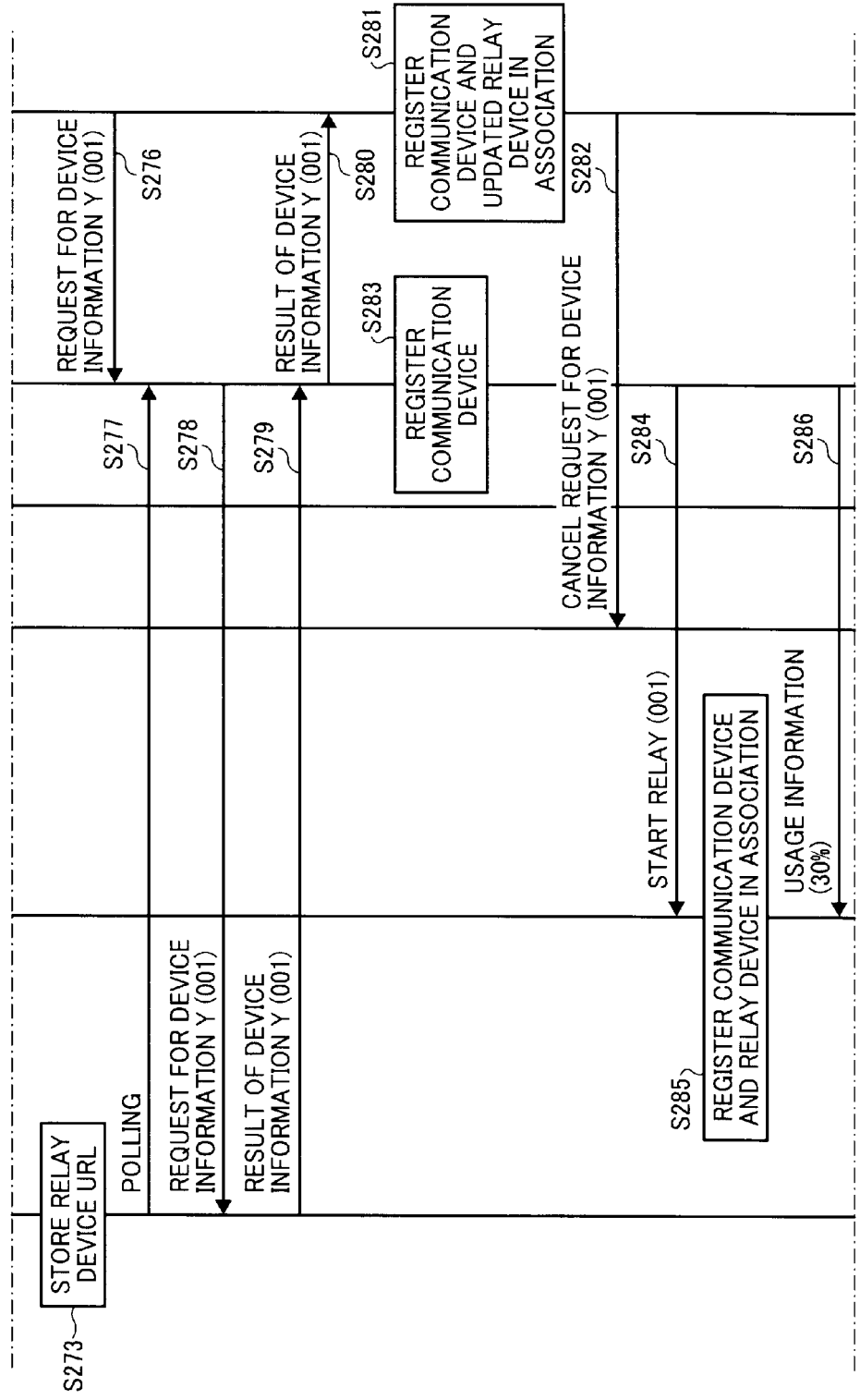
Figure 12C:
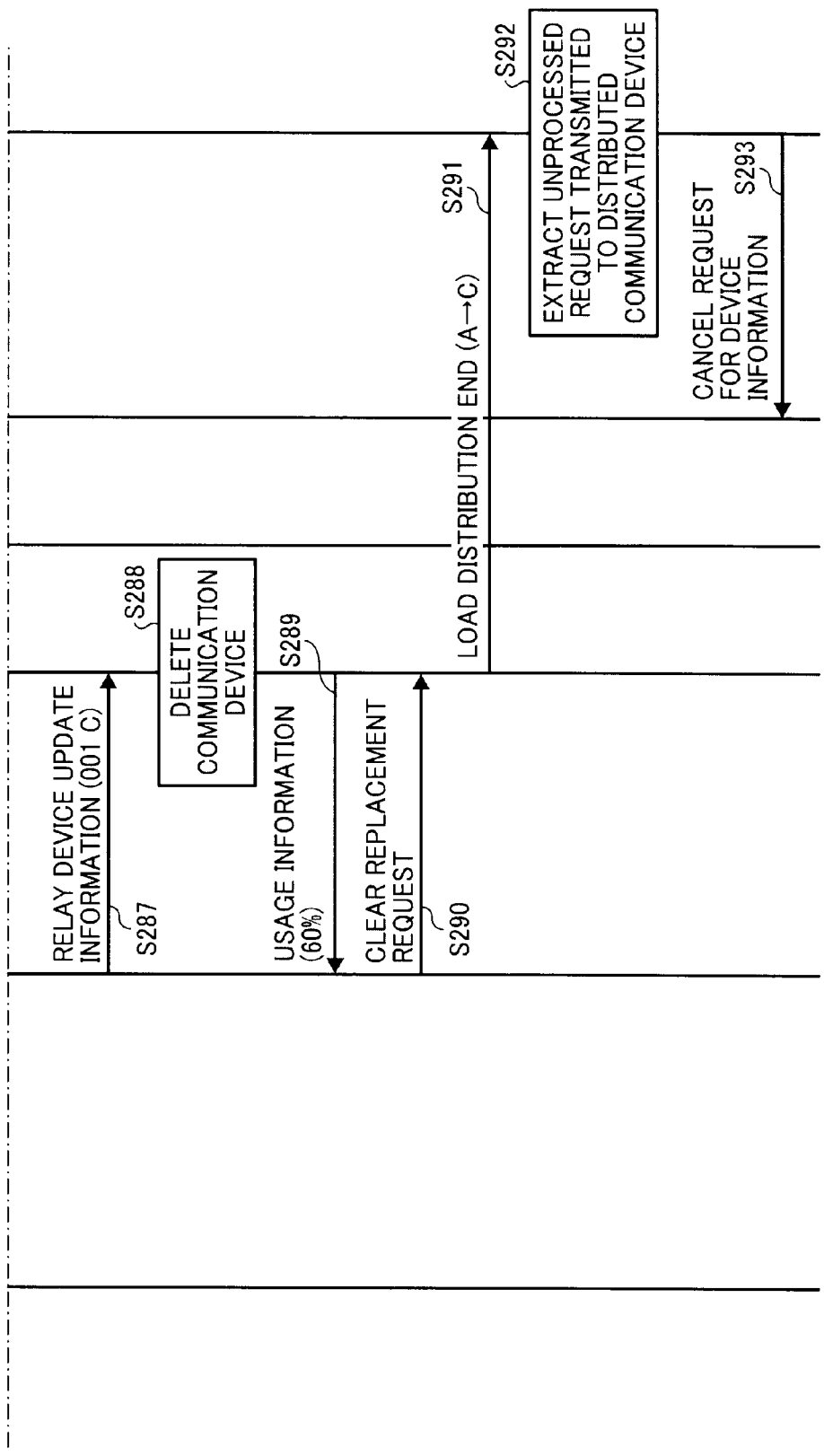

Referring now to FIGS. 12A to 12C, operation of managing a request transmitted by the management device 40 to the communication device 10 when the allocation is changed, performed by the communication system of FIG. 1, is explained according to an example embodiment of the present invention. In this example, it is assumed that the allocation of the relay device 30 changes as the allocating device 20 detects a relay device 30 that is high in processing load.

At S261 to S265, the management device 40 sends a device information request "X" for obtaining device information of the communication device 10, which is addressed to the communication device 10, through the relay device 30A. The management device 40 receives a response including the result of processing the device information request "X" from the communication device 10 through the relay device 30A. The device information request "X" includes the ID "001" of the communication device 10. This operation of sending the request and receiving the response is performed in a substantially similar manner as described above referring to S32 to S38 of FIG. 5C.

Further, at S261, the management device 40 determines to send the request to the relay device 30A, based on the allocation information that is stored, for example, at S119 of FIG. 6B. Further, based on assumption that it takes some time to process the request addressed to the communication device 10, the management device 40 stores information regarding the request addressed to the communication device 10 in a memory such as the memory 12, together with information indicating the relay device 30 to which the request is transmitted. The request that is sent is managed as an unprocessed request, until the response for that request is received.

At S266, S267, and S269, the relay devices 30A to 30C each send usage information including processing load information to the allocation device 20 at a predetermined time in a substantially similar manner as described above referring to S102 to S103 of FIG. 6A. The allocating device 20, which receives the usage information, stores at least the received processing load information in the memory for each of the relay devices 30A to 30C.

At S268, the management device 40 sends a device information request "Y" for obtaining device information, which is addressed to the communication device 10, to the relay device 30A. The relay device 30A pools the received request "Y". In this example, the relay device 30A receives the device information request "Y", before the relay device 30A sends the usage information of the relay device 30A to the allocating device 20.

At S270, the allocating device 20 determines that the processing load of the relay device 30A, which is 70%, is higher than the threshold level, and sends a request for replacement to the relay device 30A. In this example, the relay device 30C is selected to be replaced with the relay device 30A. This operation is performed in a substantially similar manner as described above referring to S175 and S176 of FIG. 9A.

The relay device 30A, which receives the request for replacement, sends an error response to the communication device 10 at S272 when accessed by the communication device 10 at S271 and causes the communication device 10 to change the relay device 30 to be accessed, in a substantially similar manner as described above referring to S177 and S178 of FIG. 9A. For this reasons, the device information request "Y" received at S268 remains in the relay device 30A without being transferred to the communication device 10.

When the request for replacement is received at S270, and the relay device 30A determines that there is a request that is pooled for the communication device 10, the relay device 30A sends notification ("load distribution notification") indicating that the work to be performed by the relay device 30A is now performed by the relay device 30C, to the management device 40. The load distribution information includes identification information of the relay device 30C to be replaced.

When the load distribution notification is received, at S275, the management device 40 refers to the management information regarding the requests that have been transmitted but not processed to extract an unprocessed request that is addressed to the communication device 10 through the relay device 30A, that is, the device information request "Y". At S276, the management device 40 transmits the extracted device information request "Y" to the relay device 30C, which is set as the relay device 30 that processes the request addressed to the communication device 10. However, at this time, the allocation of work to the relay device 30C from the relay device 30A has not been completed, or there is no guarantee that the relay device 30C relays communications for the communication device 10. The management device 40 does not cancel the unprocessed request that is addressed to the communication device 10, which is sent through the relay device 30A. Further, the management device 40 manages information regarding the device information request "Y" that is sent to the relay device 30C at S276 in a substantially similar manner as described above referring to S261 and S268. More specifically, the device information request "Y" sent through the relay device 30C is managed as an unprocessed request.

At S273, the communication device 10, which receives the error response from the relay device 30A, stores the identification information "URL-C" of the relay device 30C as information used for accessing the relay device 30C to communicate with the management device 40. At S277, when polling is performed, the relay device 30C obtains the device information request "Y", which is pooled, and sends the device information request "Y" to the communication device 10. At S279, the communication device 10 sends a response including the result of obtaining the device information, in response to the device information request "Y" to the relay device 30C. At S280, the relay device 30C transfers the response including the result of obtaining the device information, to the management device 40.

When the response to the device information request "Y" is received from the relay device 30C, the management device 40 is able to know that the relay device 30C now relays communications for the communication device 10. At S281, the management device 40 stores the relay device 30C in association with the communication device 10 to update the allocation information.

At S282, the management device 40 sends a request for canceling the device information request "Y", which is previously sent to the relay device 30, to the relay device 30A. This prevents the device information request "Y", which remains unprocessed in the relay device 30A, from being sent to the communication device 10.

S283 to S290 are performed in a substantially similar manner as described above referring to S184 to S191 of FIG. 9B. More specifically, the relay device 30C, the relay device 30A, and the allocating device 20 each update information regarding the allocation of the relay device 30 to the communication device 10 to reflect the change in allocation. Further, when the processing load of the relay device 30A becomes less than a predetermined threshold level, the allocating device 20 sends a request for clearing the request for replacement at S290.

When the request for clearing the request for replacement is received, at S291, the relay device 30A sends notification ("load distribution end notification") to the management device 40, which indicates that operation of transferring the work to be performed by the relay device 30A to the relay device 30C ends.

When the load distribution end notification is received, at S292, the management device 40 refers to the management information regarding the requests that have been transmitted but not processed to extract an unprocessed request that is addressed to the communication device 10 through the relay device 30C.

At S293, the management device 40 sends a request for canceling the unprocessed request, which is extracted at S292, to the relay device 30C. Based on the request for canceling, the relay device 30C deletes the unprocessed request from that pool. More specifically, even if there is a request that is not transferred by the relay device 30C to the communication device 10 remains in the relay device 30C, such request can be transferred to the communication device 10 through the relay device 30A after the request for replacement is cleared. Canceling the unprocessed request prevents the relay device 30C from sending the request to the communication device 10, which was or will be transmitted to the communication device 10 through the relay device 30A.

Through performing the operation of FIGS. 12A to 12C, when the management device 40 receives notification indicating that the relay function provided for the communication device 10 is performed by a newly assigned relay device 30 in replace of a previously assigned relay device 30A, any unprocessed request addressed to the communication device 10, which is pooled at the previously assigned relay device 30, is transferred to the communication device 10 through the newly assigned relay device 30. Further, any unprocessed request that is pooled at the previously assigned relay device 30 is canceled after it is transferred to the communication device 10 through the newly assigned relay device 30, based on determination whether a response to the request is received at the management device 40. Accordingly, even when the allocation of the relay device 30 changes, the communication system is able to process the request issued by the management device 40 smoothly, while suppressing an error in processing the request.

Figure 13A:
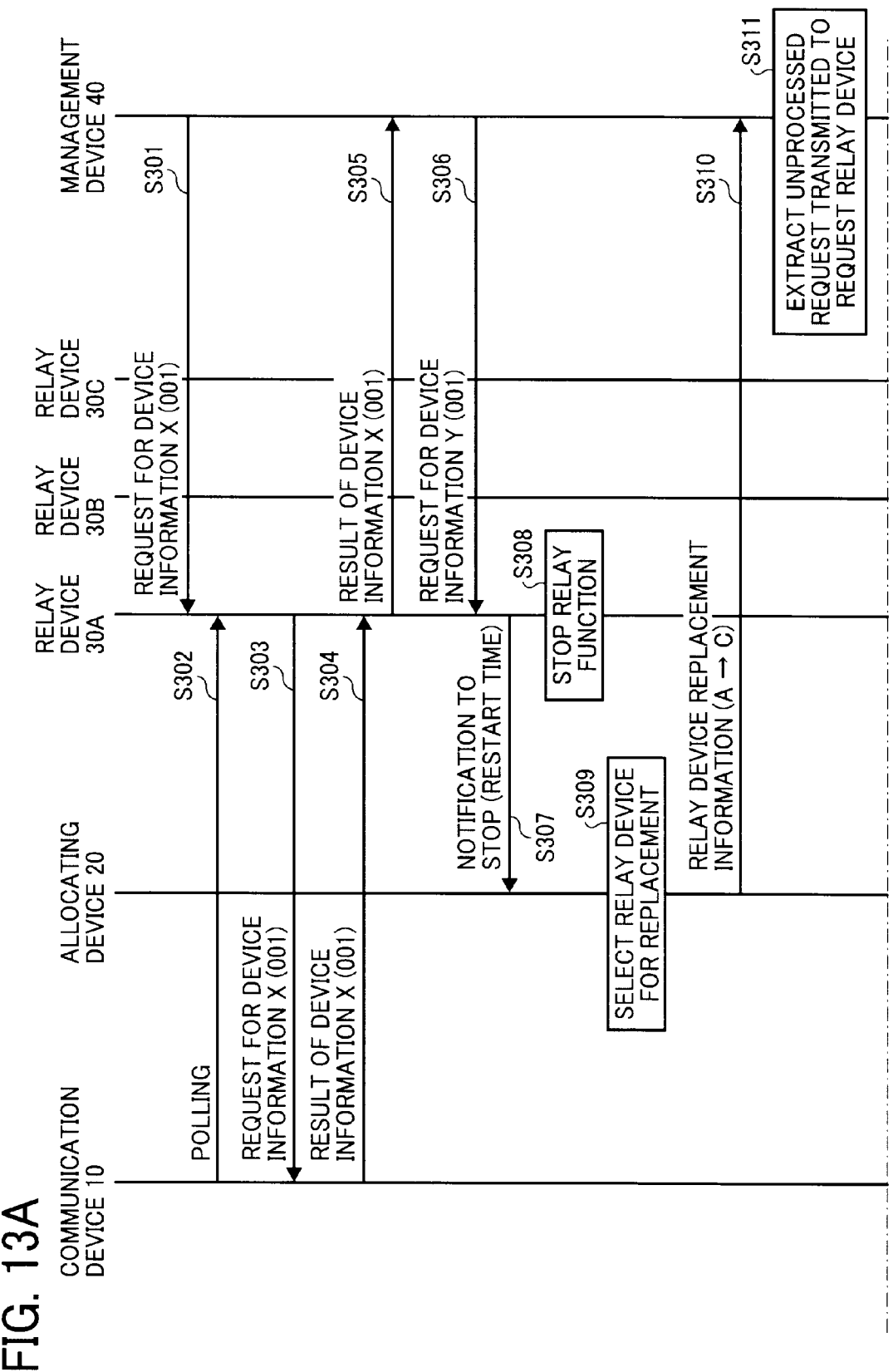
FIGS. 13A to 13C are a data sequence diagram illustrating operation of managing a request transmitted from the management device to the relay device when the allocation of the relay device is changed, performed by the communication system of FIG. 1, according to an example embodiment of the present invention.
Figure 13B:
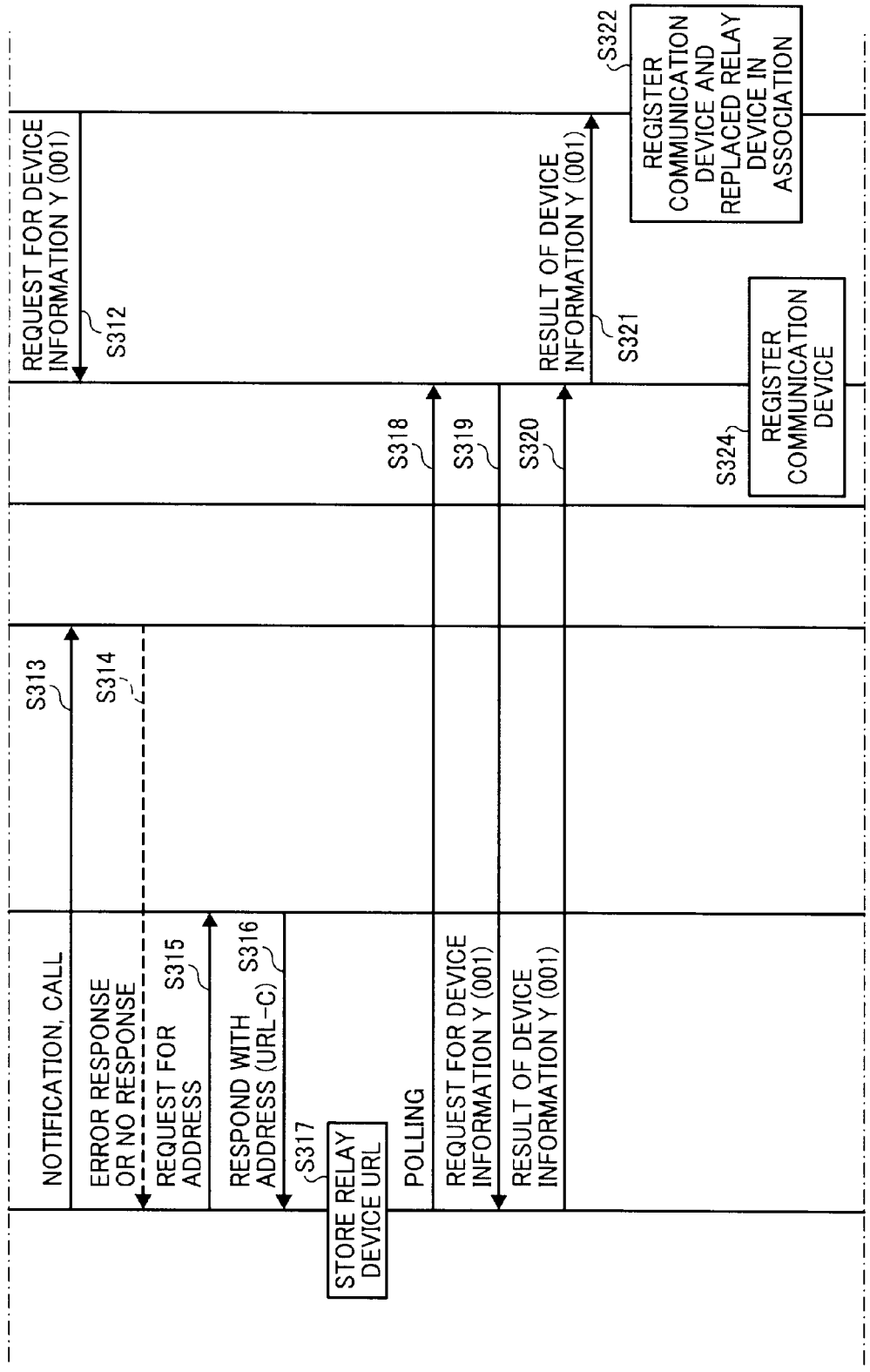
Figure 13C:
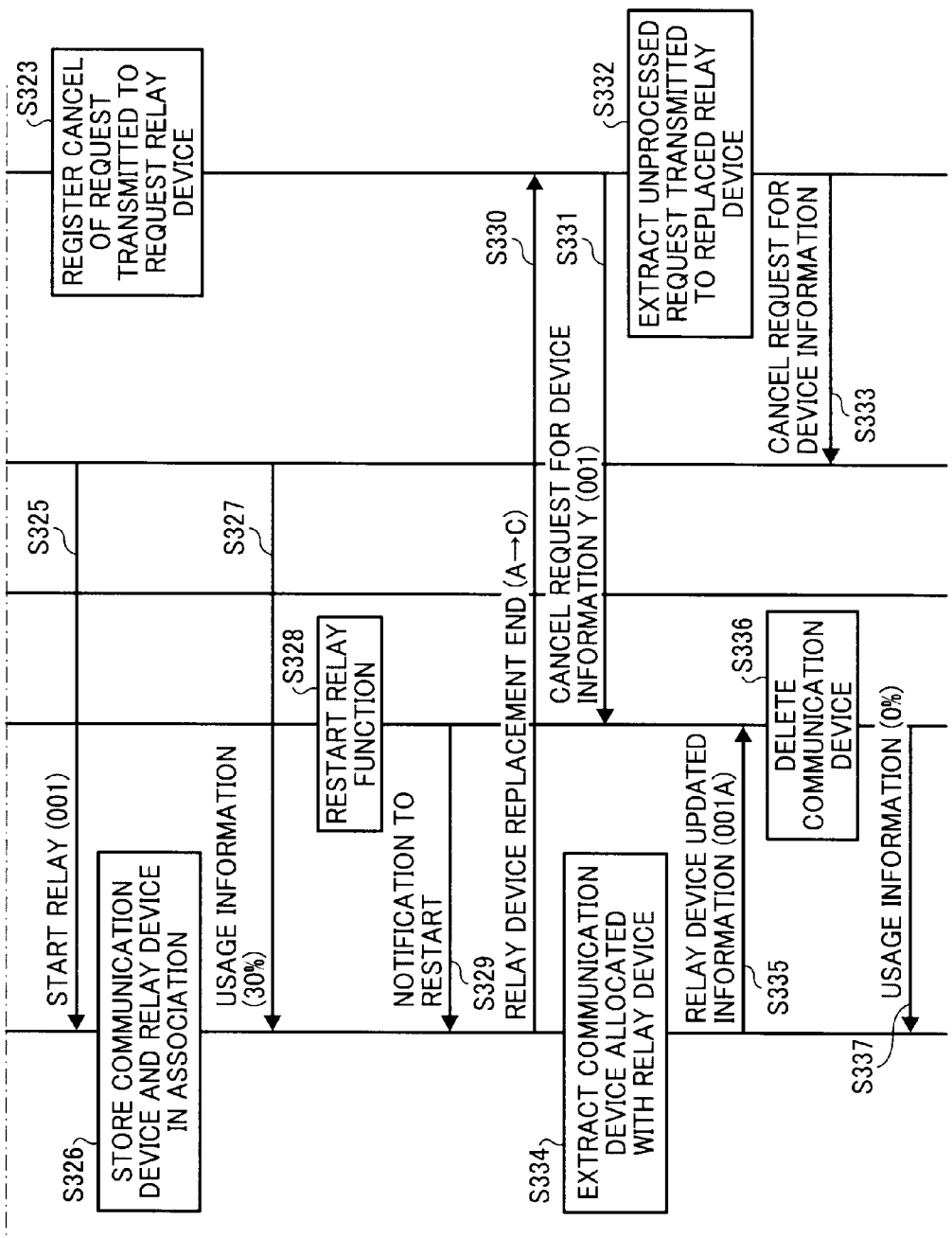

Referring now to FIGS. 13A to 13C, operation of managing a request transmitted by the management system 40 to the communication device 10 when the allocation is changed, performed by the communication system of FIG. 1, is explained according to an example embodiment of the present invention. In this example, it is assumed that the allocation of the relay device 30 changes as the relay function of the relay device 30 is stopped as described above referring to FIGS. 10A to 10C.

At S301 to S305, the management device 40 sends a device information request "X" for obtaining device information of the communication device 10, which is addressed to the communication device 10 through the relay device 30A. The management device 40 receives a response including the result of processing the device information request "X" from the communication device 10 through the relay device 30A, in a substantially similar manner as described above referring to S261 to S265 of FIGS. 12A to 12C.

At S306, the management device 40 sends a device information request "Y" for obtaining device information, which is addressed to the communication device 10, to the relay device 30A. The relay device 30A pools the received request "Y".

At S307, the relay device 30A sends notification to the allocating device 20, which indicates that the relay function is stopped. At S308, the relay device 30A stops the relay function.

In the above-described example referring to FIGS. 10A to 10C, the allocating device 20 deletes the relay device 30A from a list of candidate relay devices 30 that can be assigned to the communication device 10. In this example referring to FIGS. 13A to 13C, the allocating device 20 selects one of the relay devices 30B and 30C to be replaced with the relay device 30A in performing the work, in a substantially similar manner as described above referring to S175 of FIG. 9A. In this example, it is assumed that the relay device 30C is selected.

At S310, the allocating device 20 sends relay device replacement information to the management device 40, which indicates that the relay device 30C is now assigned to the communication device 10 in replace of the relay device 30A. Instead of causing the relay device 30A to send such relay device replacement information, the allocating device 20 sends the relay device replacement information since the relay device 30A stops the relay function. The relay device replacement information includes identification information of the relay device 30C to be replaced with the relay device 30A.

When the relay device replacement information is received, at S311, the management device 40 refers to the management information regarding the requests that have been transmitted but not processed to extract an unprocessed request that is addressed to the communication device 10 through the relay device 30A, that is, the device information request "Y". At S312, the management device 40 transmits the extracted device information request "Y" to the relay device 30C, which is set as the relay device 30 that processes the request addressed to the communication device 10.

When the communication device 10, which is assigned with the relay device 30A, accesses the relay device 30A at S313, the communication device 10 receives an error response or no response from the relay device 30A at S314 as the relay function is stopped.

At S315, the communication device 10 sends an address confirmation request to the allocating device 20 to request the allocating device 20 to assign the communication device 10 with another relay device 30.

At S316, the allocating device 20 sends identification information "URL-C" of the relay device 30C that is newly assigned to the communication device 10 at S309, to the communication device 10 in response to the address confirmation request.

At S317, the communication device 10 stores the received identification information of the relay device 30C in the memory.

At S318, the communication device 10 accesses the relay device 30C using the identification information of the relay device 30C read out from the memory to communicate with the management device 40. At S319, the communication device 10 receives the device information request "Y" from the relay device 30C. At S320, the communication device 10 sends a response including the result of executing the device information request "Y" to the relay device 30C.

At S321, the relay device 30C transfers the response including the result of executing the device information request "Y" to the management device 40.

When the response is received, the management device 40 is able to know that the relay device 30C is now assigned to the communication device 10. At S322, the management device 40 stores the relay device 30C in association with the communication device 10 to update the allocation information.

At S323, the management device 40 registers a request for canceling the device information request "Y", which is previously sent to the relay device 30A, to the relay device 30A. As described above referring to S282 of FIG. 12B, in order to prevent the device information request "Y", which remains unprocessed in the relay device 30A, from being sent to the communication device 10, the request for canceling needs to be sent to the relay device 30A. However, since the relay device 30A does not operate to provide the relay function, the management device 40 registers the request for canceling the device information request "Y" such that the request for canceling is transmitted later when the relay device 30A starts the relay function.

S324 to S327 are performed in a substantially similar manner as described above referring to S217 to S220 of FIG. 10B. More specifically, the relay device 30C, the relay device 30A, and the allocating device 20 each update information regarding the allocation of the relay device 30 to the communication device 10 to reflect the change in allocation.

When the relay device 30A restarts the relay function at S328, the relay device 30A sends notification indicating that the relay function is restarted to the allocating device 20 at S329.

S334 to S337 are performed in a substantially similar manner as described above referring to S224 to S227 of FIG. 10C to reflect the change in allocation of the relay device 30 to the communication device 10.

When the notification indicating that the relay function is restarted is received at S329, at S330, the allocating device 20 sends notification ("replacement end notification") to the management device 40, which indicates that operation of transferring the work to be performed by the relay device 30A to the relay device 30C ends.

When the replacement end notification is received, at S331, the management device 40 sends the request for canceling the request "Y", which is registered at S323, to the relay device 30A.

At S332, the management device 40 refers to the management information regarding the requests that have been transmitted but not processed to extract an unprocessed request that is addressed to the communication device 10 through the relay device 30C, in a substantially similar manner as described above referring to S292 of FIG. 12C.

At S333, the management device 40 sends a request for canceling the unprocessed request, which is extracted at S332, to the relay device 30C, in a substantially similar manner as described above referring to S293 of FIG. 12C.

Through performing the operation of FIGS. 13A to 13C, even when the relay device 30 stops its relay function, any unprocessed request addressed to the communication device 10, which is pooled at the relay device 30 that stops the relay function, is transferred to the communication device 10 through another relay device 30 that is newly assigned. Further, any unprocessed request that is pooled at the relay device 30 that stops the relay function is cancelled after it is transferred to the communication device 10 through the newly assigned relay device 30, based on determination whether a response to the request is received at the management device 40. Accordingly, even when the allocation of the relay device 30 changes, the communication system is able to process the request issued by the management device 40 smoothly, while suppressing an error in processing the request.

In the above-described example, it is assumed that the relay device 30A is able to send notification to the allocating device 20 before the relay function is stopped. Alternatively, even when the relay device 30A is not able to send notification before the relay function is stopped, the allocating device 20 determines that the relay function of the relay device 30A does not function when the usage information is not received from the relay device 30A for a predetermined time period.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

For example, a configuration of the communication system of FIG. 1, a structure of each of the devices in the communication system of FIG. 1, a specific operation to be performed by each device in the communication system of FIG. 1, or a data format of data to be processed by each device in the communication system of FIG. 1 is not limited to the above-described examples.

For example, any one of the communication device, the allocating device, the relay device, and the management device in the communication system may have a structure capable of performing at least one of the above-described operations of FIGS. 5 to 13.

In the above-described examples, it is assumed that the communication device 10 is implemented by an image forming apparatus. Alternatively, the communication device 10 may be implemented by any other electronic device provided with the function of communicating through the network. Examples of the communication device include, but not limited to, a network based home appliance device, a vending machine, a medical equipment, an electric power supply device, an air condition system, a utility meter system for gas, water, or electricity, an automobile, an aircraft, or any device provided with a processor such as a general-purpose computer.

Further, in the above-described example, the communication system of FIG. 1 functions as a remote management system. Alternatively, any desired one of the above-described functions or operations may be implemented by a communication system without the remote management capability. For example, one of the relay devices may be located within the local network in which the communication device 10 subjected for management by the management device 40 is provided.

Further, as described above, any one of the above-described and other methods of the present invention may be embodied in the form of a computer program stored in any kind of storage medium. Examples of storage mediums include, but are not limited to, flexible disk, hard disk, optical discs such as CD-ROM, magneto-optical discs, magnetic tapes, nonvolatile memory cards, SRAM, EEPROM, ROM (read-only-memory), etc. Alternatively, the computer program may be previously stored in a memory, such as a ROM or a HDD, of a computer. Alternatively, such program may be downloaded from any storage device or any storage medium through the network.

When the program is read from the memory for execution by a processor of the computer, the program causes the processor to function as any one of the above-described communication device, allocating device, relay device, and management device. Further, the processor may be implemented by any desired number of processors, which may be distributed over the network.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

Further, any of the above-described devices or units can be implemented as a hardware apparatus, such as a special-purpose circuit or device, or as a hardware/software combination, such as a processor executing a software program.

For example, in the above-described example, it is assumed that operation of assigning a relay device to the communication device 10 is performed by the allocating device 20. Alternatively, any one of the operations performed by the allocating device 20 may be performed by a plurality of modules, units, or devices in the relay system M.

In one example, the present invention may reside in an allocating device, which assigns, for each one of a plurality of first communication devices, one of a plurality of relay devices to the first communication device as a relay device that allows the first communication device to communicate with a second communication device. The allocating device includes: first receiving means for receiving processing load information indicating a processing load on the relay device, from each one of the plurality of relay devices; second receiving means for receiving a request for assigning a relay device to the first communication device from the first communication device; and allocating means for assigning one of the plurality of relay devices having a low processing load to the first communication device that sends the request based on the processing load information as a currently assigned relay device, and sending identification information of the currently assigned relay device to the first communication device, the identification information to be used by the first communication device to access the currently assigned relay device. For example, the first receiving mean corresponds to the communication I/F 13, functioning as the center communication client module 302 and/or the center communication server module 303. The second receiving means may be implemented by the communication I/F 13, functioning as the device communication module 301. The allocating means corresponds to the CPU 11, functioning as the device management module 305.

The allocating device further includes: first notifying means. When the allocating means assigns the relay device to the first communication device, the first notifying means obtains information for identifying a previously assigned relay device that is previously assigned to the first communication device. When the previously assigned relay device is different from the currently assigned relay device, the first notifying means sends a request for canceling the allocation of the previously assigned relay device to the first communication device to the previously assigned relay device. The first notifying means corresponds to the communication I/F 13, functioning as the center communication client module 302 or the center communication server module 303.

The allocating device further includes second notifying means. The first receiving means receives updated processing load information indicating an updated processing load on the currently assigned relay device, from the currently assigned relay device after the currently assigned relay device is assigned to the communication device. When the allocating device determines that the updated processing load on the currently assigned relay device obtained based on the updated processing load information received at the first receiving means is higher than a predetermined threshold level, the allocating device selects a relay device from the plurality of relay devices having a processing load that is lower than the processing load on the currently assigned relay device as a selected relay device. The allocating device causes the second notifying means to send information regarding the selected relay device to the currently assigned relay device as a relay device to be replaced with the currently assigned relay device in performing the relay function. For example, the second notifying means corresponds to the communication I/F 13, functioning as the center communication client module 302 or the center communication server module 303, which operates under control of the CPU 11, functioning as the device management module 305.

The allocating device further includes third notifying means. After the second notifying means sends information regarding the selected relay device, and when the allocating device determines that an updated processing load of the currently assigned relay device obtained based on updated processing load information received at the first receiving means is lower than a predetermined threshold level, the allocating device causes the third notifying means to send notification to the currently assigned relay device indicating that the information regarding the selected relay device is invalid. For example, the third notifying means corresponds to the communication I/F 13, functioning as the center communication client module 302 or the center communication server module 303, which operates under control of the CPU 11, functioning as the device management module 305.

The first receiving means includes means for receiving stop information indicating that a relay function is stopped or restart information indicating that the relay function is restarted from the relay device. When the stop information indicating the relay function is stopped is received, the allocating means does not assign the relay device that sends the stop information at least until the restart information is received from the relay device.

For example, the allocating means includes selecting means for selecting a relay device to be replaced with the relay device that sends the stop information, based on processing load information of each one of the plurality of relay devices that is received at the first receiving means. The allocating device further includes fourth notifying means for notifying the second communication device that the selected relay device performs a relay function in replace of the relay device that sends the stop information. When a request for assigning is received at the second receiving means from the first communication device after the stop information indicating the relay function is stopped is received at the first receiving means, the allocating device obtains information indicating the currently assigned relay device that is currently assigned to the first communication device. When the currently assigned relay device matches the relay device that sends the stop information, the allocating means assigns the selected relay device that is selected by the selecting means to the first communication device that sends the request. For example, the fourth notifying means corresponds to the communication I/F 13, functioning as the center communication client module 302 or the center communication server module 303.

The first receiving means includes means for receiving restart information indicating that the relay function is restarted from the relay device. The allocating device further includes fifth notifying means for notifying the second communication device that the first receiving means receives the restart information. For example, the fifth notifying means corresponds to the communication I/F 13, functioning as the center communication client module 302 or the center communication server module 303.

In one example, the present invention may reside in a communication device to be assigned with a relay device to communicate with a second communication device. The communication device includes: storage means for storing identification information for identifying a relay device to be accessed to communicate with the second communication device; transmitting means for sending a request for assigning a relay device to the communication device to the allocating device, when the storing means does not store the identification information of the relay device or when the communication device is not able to communicate with the relay device to be accessed; and updating means for storing identification information for identifying a relay device that is sent from the allocating device in response to the request for assigning, in the storage means, as identification information of the relay device to be accessed. For example, the storage means corresponds to the memory 12, functioning as the set data 105. The transmitting means corresponds to the communication I/F 13, functioning as the communication library 101. The updating means corresponds to the CPU 11, functioning as the remove management SDK application 104.

For example, the communication device to communicate with a counterpart communication device includes: a communication interface to send a request for assigning one of a plurality of relay devices to the communication device; a processor to receive identification information for identifying a currently assigned relay device to be accessed by the communication device to communicate with the counterpart communication device; and a memory to store the identification information of the currently assigned relay device.

When the communication device receives identification information for identifying a relay device to be accessed in replace of the currently assigned relay device from the relay device that is accessed using the identification information stored in the storing means, the updating means updates the identification information of the relay device to be accessed that is stored in the storage means with the identification information for identifying the relay device that is received.

In one example, the present invention may reside in a relay device that relays communications between one of a plurality of first communication devices and a second communication device. Each of the relay devices includes: transmitting means for transmitting processing load information indicating a processing load on the relay device to an allocating device, the allocating device to allocate the relay device to the first communication device; replacement device information receiving means for receiving replacement information for identifying a relay device to be replaced with the relay device from the allocating device; and allocation changing means for rejecting a relay function to be performed for the first communication device when accessed by the first communication device after the replacement information is received, and transmitting identification information for identifying the relay device to be replaced that is obtained from the replacement information to the first communication device to cause the first communication device to access the relay device to be replaced. For example, the transmitting means corresponds to the communication I/F 13, functioning as the center communication client module 302 or the center communication server module 303. The replacement device information receiving means corresponds to the communication I/F 13, functioning as the center communication client module 302 or the center communication server module 303. The allocation changing means corresponds to the CPU 11, functioning as the device management module 305, which operates in cooperation with the communication I/F 13, functioning as the device communication module 301.

The relay device further includes replacement notifying means. When the replacement device information receiving means receives the replacement information, the replacement notifying means notifies the second communication device that a relay function to be performed by the relay device for the first communication device is now performed by the relay device obtained from the replacement information. For example, the replacement notifying means corresponds to the communication I/F 13, functioning as the center communication client module 302 or the center communication server module 303.

When the relay device receives information indicating that the replacement information received at the replacement device information receiving means should be made invalid from the allocating device, the relay device causes the changing means to be invalid.

The relay device further includes stop information transmit means for transmitting stop information indicating that a relay function of the relay device is stopped to the allocating device, when the relay function is stopped.

In one example, the present invention may reside in a communication device, which communicates with each one of a plurality of counterpart communication devices through one of a plurality of relay devices each associated with the one of the plurality of counterpart communication devices. The communication device includes: registering means for receiving a request for registering a counterpart communication device to be managed by the communication device through a relay device, and registering the counterpart communication device and the relay device in association with each other; transmitting means for transmitting a request addressed to the counterpart communication device to the relay device that is associated with the counterpart communication device; receiving means for receiving a response received from the counterpart communication device in response to the request through the relay device; replacement means for receiving notification indicating that a relay function of the relay device to be performed for the counterpart communication device is now performed by a different relay device from at least one of the relay device and an allocating device that allocates the relay device to the counterpart communication device, and transmitting an unprocessed request that is transmitted to the relay device but not processed by the counterpart communication device to the different relay device; and canceling means for canceling one of information regarding an unprocessed request that is sent to the relay device and information regarding an unprocessed request that is sent to the different relay device when the receiving means receives a response transmitted from the counterpart communication device in response to the unprocessed request through one of the relay device and the different relay device.

When the communication device receives a response transmitted by the counterpart communication device in response to the request or a response transmitted by the counterpart communication device through a relay device that is different from the relay device that is associated with the counterpart communication device, the communication device updates the information regarding the relay device that is associated with the counterpart communication device.

In one example, the present invention may reside in a relay system including a plurality of relay devices, and an allocating device that assigns one of the plurality of relay devices to a first communication device that communicates with a second communication device. The relay device includes transmitting means for transmitting processing load information indicating a processing load on the relay device. The allocating device includes first receiving means for receiving the processing load information from each one of the plurality of relay devices; second receiving means for receiving a request for assigning one of the relay devices to the first communication device, from the first communication device; and allocating means for assigning one of the plurality of relay devices having a low processing load to the first communication device that sends the request based on the processing load information, and sending identification information of the currently assigned relay device to the first communication device, the identification information to be used by the first communication device to access the currently assigned relay device.

In one example, the present invention may reside in an allocating method of assigning one of a plurality of relay devices to one of a plurality of first communication devices that communicates with a second communication device. The allocating method includes: receiving processing load information indicating a processing load on the relay device, from each one of the plurality of relay devices; receiving a request for assigning a relay device to the first communication device to communicate with the second communicating device from the first communication device; assigning one of the plurality of relay devices having a low processing load to the first communication device that sends the request based on the processing load information; and sending identification information of the currently assigned relay device to the first communication device, the identification information to be used by the first communication device to access the currently assigned relay device.

In one example, the present invention may reside in a plurality of instructions which, when executed by a processor, cause the processor to perform the above-described allocating method.

In one example, the present invention may reside in a plurality of instructions which, when executed by a processor, cause the processor to function as any one of the above-described allocating devices. In one example, the present invention may reside in a plurality of instructions which, when executed by a processor, cause the processor to function as any one of the above-described communication devices. In one example, the present invention may reside in a plurality of instructions which, when executed by a processor, cause the processor to function as any one of the above-described relay devices.

In one example, the present invention may reside in a non-transitory recording medium storing any one of the above-described plurality of instructions.

In one example, the present invention may reside in: a method of communicating with a second communication device performed by a first communication device, the method including: sending a request for assigning one of a plurality of relay devices to the first communication device to an allocating device using identification information stored in a memory, to cause the allocating device to assign one of the plurality of relay devices having a low processing load to the first communication device as a currently assigned relay device; receiving identification information for identifying the currently assigned relay device from the allocating device; storing the identification information of the currently assigned relay device in a memory; and accessing the currently assigned relay device using the identification information stored in the memory to communicate with the second communication device through the currently assigned relay device.

In one example, the present invention may reside in a method of assigning one of a plurality of relay devices to a first communication device as a relay device that relays data between the first communication device and a second communication device through a network. The method includes: receiving processing load information indicating a processing load on each one of the plurality of relay devices, from each one of the plurality of relay devices; storing the processing load information in a memory; receiving a request for assigning a relay device to the first communication device from the first communication device; selecting one of the plurality of relay devices having a low processing load based on the processing load information stored in the memory as a currently assigned relay device that is currently assigned to the first communication device; and sending identification information of the currently assigned relay device to the first communication device to cause the first communication device to access the currently assigned relay device using the identification information.

In one example, the present invention may reside in a method of managing a plurality of first communication devices. The method includes: storing allocation information indicating the association between the first communication device and a currently assigned relay device that is currently assigned to the first communication device; sending a request addressed to the first communication device to the currently assigned relay device, and receiving a response generated by the first communication device with respect to the request from the currently assigned relay device. The method further includes: receiving information indicating that operation of relaying data for the first communication device is performed by a selected relay device in replace of the currently assigned relay device from at least one of an allocating device and the currently assigned relay device; obtaining information regarding an unprocessed request that is transmitted to the currently assigned relay device but not processed by the first communication device; sending a request that is generated based on the extracted unprocessed request to the selected relay device; determining which one of the currently assigned relay device and the selected relay device sends a response generated by the first communication device with respect to the unprocessed request to the second communication device; and canceling one of the request that is transmitted to the currently assigned relay device and the request that is transmitted to the selected relay device based on information regarding which one of the currently assigned relay device and the selected relay device sends the response.

What is claimed is:

1. A system of assigning one of a plurality of relay devices to a first communication device as a relay device that relays data between the first communication device and a second communication device through a network, the system comprising:
    a first communication interface to receive processing load information indicating a processing load on each one of the plurality of relay devices, from each one of the plurality of relay devices;
    a memory to store the processing load information;
    a second communication interface to receive a request for assigning a relay device to the first communication device from the first communication device; and
    a processor to:
        select one of the plurality of relay devices having a low processing load based on the processing load information stored in the memory as a currently assigned relay device that is currently assigned to the first communication device; and
        send identification information of the currently assigned relay device to the first communication device through the second communication interface to cause the first communication device to access the currently assigned relay device using the identification information,
    wherein the processor is further configured to:
    receive first updated processing load information indicating an updated processing load on the currently assigned relay device from the currently assigned relay device through the first communication interface, the first updated processing load information reflecting the updated processing load that is obtained after the currently assigned relay device is assigned to the first communication device;
    determine whether the updated processing load on the currently assigned relay device obtained from the first updated processing load information is higher than a predetermined threshold level;
    select one of the plurality of relay devices having a processing load that is lower than the updated processing load on the currently assigned relay device as a selected relay device, when the updated processing load on the currently assigned relay device is higher than the predetermined threshold level; and
    send a replacement start request that requests the currently assigned relay device to start operation of transferring a request transmitted to the currently assigned relay device to the selected relay device, to the currently assigned relay device through the first communication interface, the replacement start request including identification information for identifying the selected relay device.

2. The system of claim 1, wherein the processor is further configured to:
    determine whether the currently assigned relay device matches a previously assigned relay device that is previously assigned to the first communication device that sends the request; and
    send a request for canceling allocation information indicating that the previously assigned relay device is assigned to the first communication device, to the previously assigned relay device through the first communication interface, when the currently assigned relay device does not match the previously assigned relay device.

3. The system of claim 1, wherein the replacement start request causes the currently assigned relay device to send an error response to the first communication device, when the currently assigned relay device receives data addressed to the second communication device from the first communication device after the replacement request is received at the currently assigned relay device.

4. The system of claim 3, wherein the replacement start request further causes the currently assigned relay device to send information indicating that operation of transferring a request transmitted to the currently assigned relay device to the selected relay device is started, to the second communication device.

5. The system of claim 1, wherein the processor is further configured to:
    receive second updated processing load information indicating an updated processing load on the currently assigned relay device from the currently assigned relay device through the first communication interface, the second updated processing load reflecting the updated processing load that is obtained after the replacement start request is transmitted to the currently assigned relay device;
    determine whether the updated processing load of the currently assigned relay device obtained from the second updated processing load information is less than a predetermined threshold level; and
    send a replacement end request that requests the currently assigned relay device to stop operation of transferring a request transmitted to the currently assigned relay device to the selected relay device, to the currently assigned relay device through the first communication interface.

6. The system of claim 5, wherein the replacement end request further causes the currently assigned relay device to start accepting data addressed to the second communication device that is transmitted from the first communication device, the first communication device being, assigned to the currently assigned relay device.

7. The system of claim 6, wherein the replacement end request further causes the currently assigned relay device to send information indicating that operation of transferring a request transmitted to the currently assigned relay device to the selected relay device is stopped, to the second communication device.

8. The system of claim 1, wherein the processor is further configured to:
receive relay function stop information indicating that a relay function is stopped from one of the plurality of relay devices, through the first communication interface; and
delete the relay device that sends the relay function stop information from a list of the plurality of relay devices that may be assigned to the first communication device.

9. A system of assigning one of a plurality of relay devices to a first communication device as a relay device that relays data between the first communication device and a second communication device through a network, the system comprising:
a first communication interface to receive processing load information indicating a processing load on each one of the plurality of relay devices, from each one of the plurality of relay devices;
a memory to store the processing load information;
a second communication interface to receive a request for assigning a relay device to the first communication device from the first communication device; and
a processor to:
select one of the plurality of relay devices having a low processing load based on the processing load information stored in the memory as a currently assigned relay device that is currently assigned to the first communication device; and
send identification information of the currently assigned relay device to the first communication device through the second communication interface to cause the first communication device to access the currently assigned relax device using the identification information,
wherein the processor is further configured to:
receive relay function stop information indicating that a relay function is stopped from one of the plurality of relay devices, through the first communication interface;
delete the relay device that sends the relay function stop information from a list of the plurality of relay devices that may be assigned to the first communication device;
select one of the plurality of relay devices other than the relay device that sends the relay function stop information, based on the processing load information stored in the memory as a selected relay device;
send information indicating that operation of relaying data for the first communication device is performed by the selected relay device in replace of the relay device that sends the relay function stop information, to the second communication device;
determine whether the currently assigned relay device that is currently assigned to the first communication device matches the relay device that sends the relay function stop information, when the request for assigning a relay device is received from the first communication device through the second communication interface; and
send identification information for identifying the selected relay device to the first communication device that sends the request through the second communication interface, when the currently assigned relay device of the first communication device matches the relay device that sends the relay function stop information.

10. A system of assigning one of a plurality of relay devices to a first communication device as a relay device that relays data between the first communication device and a second communication device through a network, the system comprising:
a first communication interface to receive processing load information indicating a processing load on each one of the plurality of relay devices, from each one of the plurality of relay devices;
a memory to store the processing load information;
a second communication interface to receive a request for assigning a relay device to the first communication device from the first communication device; and
a processor to:
select one of the plurality of relay devices having a low processing load based on the processing load information stored in the memory as a currently assigned relay device that is currently assigned to the first communication device; and
send identification information of the currently assigned relay device to the first communication device through the second communication interface to cause the first communication device to access the currently assigned relay device using the identification information,
wherein the processor is further configured to:
receive relay function stop information indicating that a relay function is stopped from one of the plurality of relay devices, through the first communication interface;
delete the relay device that sends the relay function stop information from a list of the plurality of relay devices that may be assigned to the first communication device;
receive restart information indicating that the relay function is restarted from the relay device that sends the relay function stop information; and
send information indicating that the relay device that sends the relay function stop information restarts the relay function to the second communication device.

11. A communication device to communicate with a counterpart communication device through a network, the communication device comprising:
a communication interface to:
send a request for assigning one of a plurality of relay devices to the communication device to an allocating device using identification information stored in a memory, wherein the request for assigning causes the allocating device to assign one of the plurality of relay devices having a low processing load to the communication device as a currently assigned relay device, and
receive identification information for identifying the currently assigned relay device from the allocating device;
a memory to store the identification information of the currently assigned relay device; and
a processor to access the currently assigned relay device using the identification information stored in the memory to communicate with the second communication device through the currently assigned relay device,
wherein the communication interface sends the request for assigning to the allocating device when at least one of the conditions is satisfied the conditions including:

a condition in which identification information of a previously assigned relay device that is previously assigned to the communication device is not stored in the memory;

a condition in which the communication device does not receive a response from the previously assigned relay device that is accessed using the identification information of the previously assigned relay device stored in the memory; and a condition in which the communication device receives an error response indicating that the previously assigned relay device does not perform operation of relaying data for the communication device, from the previously assigned relay device that is accessed using the identification information of the previously assigned relay device stored in the memory.

12. The communication device of claim 11, wherein the processor is further configured to:

determine whether the error response includes identification information for identifying a relay device to be accessed by the communication device in replace of the previously assigned relay device, when the error response is received; and access the relay device using the identification information of the relay device to be accessed without sending the request for assigning to the allocating device, when the error response includes the identification information of the relay device to be accessed.

13. A communication system, comprising:

an allocating device to assign one of a plurality of relay devices to a first communication device as a relay device that relays data between the first communication device and a second communication device through a network; and the second communication device including:

a memory to store allocation information indicating the association between the first communication device and a currently assigned relay device that is currently assigned to the first communication device;

a communication interface to send a request addressed to the first communication device to the currently assigned relay device, and to receive a response generated by the first communication device with respect to the request from the currently assigned relay device; and a processor to:

receive information indicating that operation of relaying data for the first communication device is performed by a selected relay device in replace of the currently assigned relay device from at least one of the allocating device and the currently assigned relay device;

obtain information regarding art unprocessed request that is transmitted to the currently assigned relay device but not processed by the first communication device;

send a request that is generated based on the extracted unprocessed request to the selected relay device;

determine which one of the currently assigned relay device and the selected relay device sends a response generated by the first communication device with respect to the unprocessed request to the second communication device; and cancel one of the request that is transmitted to the currently assigned relay device and the request that is transmitted to the selected relay device based on information regarding which one of the currently assigned relay device and the selected relay device sends the response, wherein the processor is further configured to:

receive first updated processing load information indicating an updated processing load on the currently assigned relay device from the currently assigned relay device through the first communication interface, the first updated processing load information reflecting the updated processing load is obtained after the currently assigned relay device is assigned to the first communication device;

determine whether the updated processing load on the currently assigned relay device obtained from the first updated processing load information is higher than a predetermined threshold level;

select one of the plurality of relay devices having a processing load that is lower than the updated processing load on the currently assigned relay device as a selected relay device, when the updated processing load on the currently assigned relay device is higher than the predetermined threshold level; and send a replacement request that requests the currently assigned relay device to start operation of transferring a requested transmitted to currently assigned relay device to the selected relay device to the currently assigned relay device through the first communication interface the replacement start request including identification information for identifying the selected relay device.

14. The communication system of claim 13, wherein the processor is further configured to:

update the allocation information stored in the memory to reflect the association between the first communication device and the selected relay device, when the processor determines that the selected relay device sends the response to the second communication device.

* * * * *